US012679649B2

(12) United States Patent
Thable et al.

(10) Patent No.: US 12,679,649 B2
(45) Date of Patent: Jul. 14, 2026

(54) ROBOT SYSTEM FOR STORAGE AUTOMATION AND/OR METHOD THEREFOR

(71) Applicant: Mytra, Inc., Brisbane, CA (US)

(72) Inventors: Gagandeep Thable, Brisbane, CA (US); Kody Brown, Brisbane, CA (US); Stefan Ozog, Winnipeg (CA); Ryan Williams, Brisbane, CA (US); Christopher Walti, Brisbane, CA (US)

(73) Assignee: Mytra, Inc., Brisbane, CA (US)

( * ) Notice: Subject to any disclaimer, the term of this patent is extended or adjusted under 35 U.S.C. 154(b) by 0 days.

(21) Appl. No.: 19/272,945

(22) Filed: Jul. 17, 2025

(65) Prior Publication Data

US 2026/0021965 A1      Jan. 22, 2026

Related U.S. Application Data

(60) Provisional application No. 63/735,208, filed on Dec. 17, 2024, provisional application No. 63/672,589, filed on Jul. 17, 2024.

(51) Int. Cl.
B65G 1/06        (2006.01)
B61B 13/02        (2006.01)
(Continued)

(52) U.S. Cl.
CPC .............. B65G 1/065 (2013.01); B61B 13/02 (2013.01); B61C 9/46 (2013.01); B62D 57/024 (2013.01);
(Continued)

(58) Field of Classification Search
CPC ...... B65G 1/065; B65G 1/0471; B61B 13/02; B61C 9/46; B62D 57/024; B60B 19/12; B60K 1/02
See application file for complete search history.

(56) References Cited

U.S. PATENT DOCUMENTS 3,215,227 A * 11/1965 Macchesney ........... B66B 9/025
                                                                187/271
3,766,788 A    10/1973 Metz
                    (Continued)

FOREIGN PATENT DOCUMENTS

CN        105598942 B      6/2018
CN        109099128 A      12/2018
                    (Continued)

OTHER PUBLICATIONS

Clark, et al., "System and Method for Unified Material Storage and Transporation", U.S. Appl. No. 19/205,835, filed May 12, 2025.
                    (Continued)

*Primary Examiner* — Valentin Neacsu
*Assistant Examiner* — Michael R Stabley
(74) *Attorney, Agent, or Firm* — Jeffrey Schox; Evan Myers

(57) ABSTRACT

The system can include: a chassis, sensor suite, computing system, a set of drive mechanisms, a set of deployment mechanisms, and/or any other suitable components. The system can optionally include a support tray and a set of tray actuators. However, the system can additionally or alternatively include any other suitable set of components. The system functions to traverse within a support frame. Additionally or alternatively, the system can structurally support and/or a transport payload (e.g., shipping pallet), such as on the optional support tray (e.g., which may be actuated/locked into the support frame). However, the system can provide any other suitable functionalities.

20 Claims, 20 Drawing Sheets

(51) Int. Cl.

| | |
|---|---|
| *B61C 9/46* | (2006.01) |
| *B62D 57/024* | (2006.01) |
| *B65G 1/04* | (2006.01) |
| *B60B 19/12* | (2006.01) |
| *B60K 1/02* | (2006.01) |

(52) U.S. Cl.

CPC ............ *B65G 1/0471* (2013.01); *B60B 19/12* (2013.01); *B60K 1/02* (2013.01)

(56) References Cited

U.S. PATENT DOCUMENTS

| | | | |
|---|---|---|---|
| 4,285,249 A | | 8/1981 | Kume |
| 4,287,967 A | * | 9/1981 | Perkins .................. B66B 9/025 |
| | | | 187/268 |
| 4,541,297 A | | 9/1985 | Fujita |
| 5,592,852 A | | 1/1997 | Parsons |
| 5,960,668 A | | 10/1999 | Tseng et al. |
| 6,598,708 B2 | | 7/2003 | St-germain et al. |
| 7,381,022 B1 | | 6/2008 | King |
| 8,721,251 B1 | | 5/2014 | Razumov |
| 10,435,241 B2 | | 10/2019 | Lert et al. |
| 11,554,917 B2 | | 1/2023 | Stevens et al. |
| 12,345,312 B2 | | 7/2025 | Ozog et al. |
| 2008/0277243 A1 | | 11/2008 | Hayduchok et al. |
| 2014/0182977 A1 | | 7/2014 | Chen |
| 2015/0127143 A1 | | 5/2015 | Lindbo et al. |
| 2015/0178673 A1 | | 6/2015 | Penneman |
| 2016/0214835 A1 | | 7/2016 | Jin |
| 2017/0121110 A1 | | 5/2017 | Zombori |
| 2018/0148259 A1 | | 5/2018 | Gravelle et al. |
| 2018/0244467 A1 | | 8/2018 | Hognaland |
| 2018/0305122 A1 | | 10/2018 | Moulin et al. |
| 2019/0359423 A1 | | 11/2019 | Lee et al. |
| 2019/0375589 A1 | | 12/2019 | Gravelle et al. |
| 2021/0170583 A1 | | 6/2021 | Edsinger et al. |
| 2021/0347569 A1 | | 11/2021 | Dayrell |
| 2023/0158685 A1 | | 5/2023 | Lin et al. |
| 2024/0140714 A1 | | 5/2024 | Walti et al. |

FOREIGN PATENT DOCUMENTS

| | | |
|---|---|---|
| CN | 114536346 B | 4/2023 |
| CN | 115561004 B | 4/2023 |
| DE | 3712087 A1 | 10/1987 |
| DE | 102005006475 B3 | 5/2006 |
| GB | 2059540 A | 4/1981 |
| WO | 2012123335 A1 | 9/2012 |
| WO | 2022109452 A2 | 5/2022 |

OTHER PUBLICATIONS

Herrero, et al., "Method and System for Control of a Vertically Translatable Robot", U.S. Appl. No. 19/046,366, filed Feb. 5, 2025.

Thable, et al., "Robot System for Storage Automation and/or Method Therefore", U.S. Appl. No. 19/272,945, filed Jul. 17, 2025.

Thable, et al., "System and Method for Multi-Rack Storage", U.S. Appl. No. 19/236,841, filed Jun. 12, 2025.

Walti, et al., "System and/or Method for Dynamic Rebalancing of Multi-Rack Storage", U.S. Appl. No. 18/964,303, filed Nov. 29, 2024.

* cited by examiner

TOP VIEW

TOP VIEW

100

REAR VIEW

100

SIDE VIEW (LEFT)

FRONT VIEW

SIDE VIEW (RIGHT)

lateral drive assembly lateral drive actuator driveline
(e.g., spur gear
transmission)

lateral drive wheels (passive) guide roller linkage assembly anti-roll bar deployment
mechanism lateral drive assembly lateral drive assembly vertical drive
assembly engagement features

160

100

110

100

3D vehicle paths

200 payload support
tray 10 deployment
mechanism alignment
feature

100

100 retracted deployed retracted

160

110

120

144

142

142 locating feature lift mechanism
160

200

120

110

Engaging a payload tray

Validating a payload envelope

Determining a 3D vehicle path

Traversing with a set of drive mechanisms

Disengaging the payload tray

ROBOT SYSTEM FOR STORAGE AUTOMATION AND/OR METHOD THEREFOR

CROSS-REFERENCE TO RELATED APPLICATIONS

This application claims the benefit of U.S. Provisional Application No. 63/735,208, filed 17 Dec. 2024, and U.S. Provisional Application No. 63/672,589, filed 17 Jul. 2024, each of which is incorporated in its entirety by this reference.

This application is related to U.S. application Ser. No. 19/205,835, filed 12 May 2025, U.S. application Ser. No. 18/493,278, filed 24 Oct. 2023, U.S. application Ser. No. 18/531,184, filed 6 Dec. 2023, and U.S. application Ser. No. 19/046,366, filed 5 Feb. 2025, each of which is incorporated in its entirety by this reference.

TECHNICAL FIELD

This invention relates generally to the storage automation field, and more specifically to a new and useful robotic system and/or method in the storage automation field.

DESCRIPTION OF THE PREFERRED EMBODIMENTS

Figure 1:
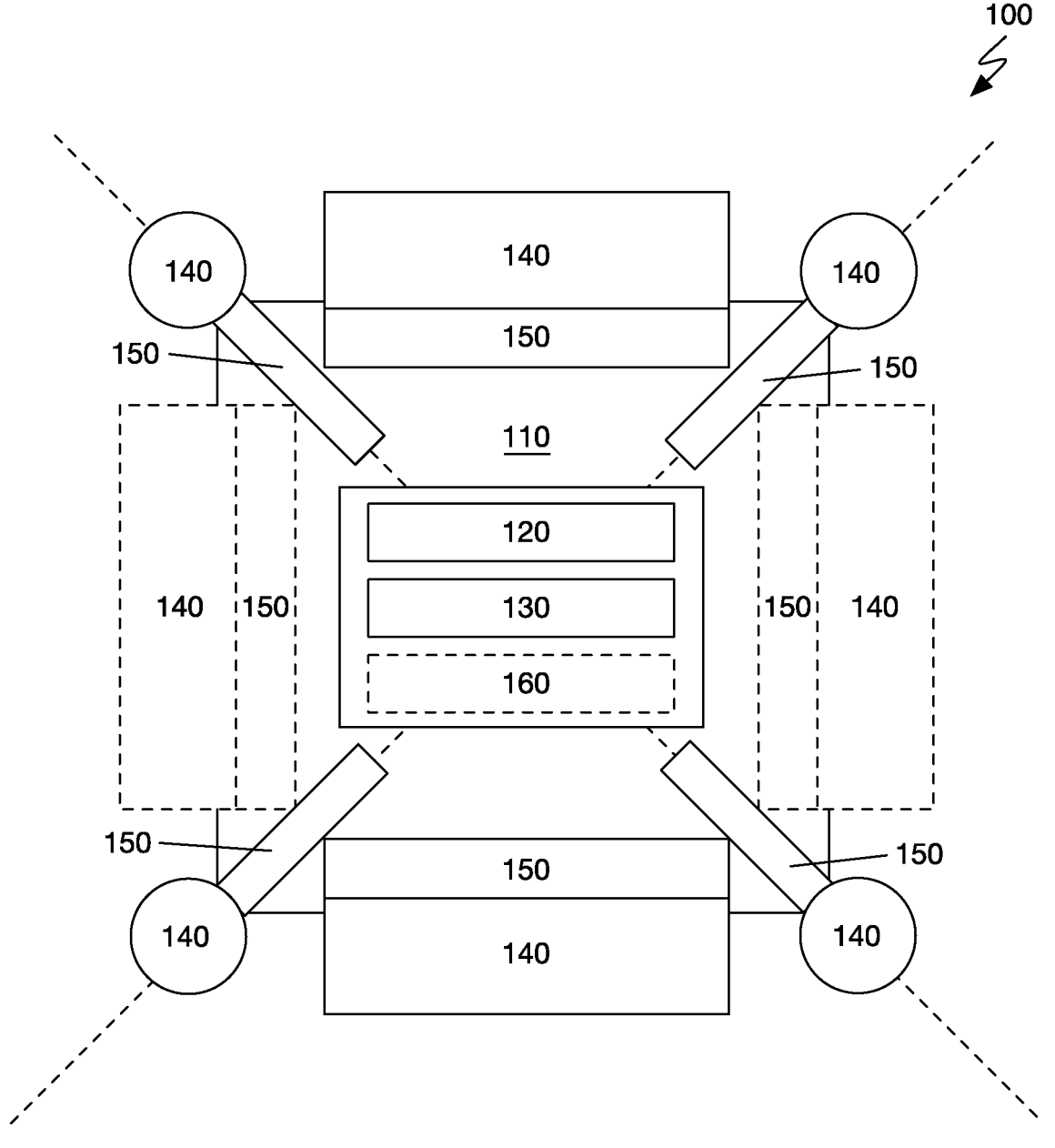
FIG. 1 is a schematic representation of a variant of the system.

The following description of the preferred embodiments of the invention is not intended to limit the invention to these preferred embodiments, but rather to enable any person skilled in the art to make and use this invention.

1. Overview

The robot system 100 can include: a chassis 110, sensor suite 120, computing system 130, a set of drive mechanisms 140, a set of deployment mechanisms 150, and/or any other suitable components. The system 100 can optionally include a support tray 10 (a.k.a., cell tray) and a set of tray actuators 160. However, the system 100 can additionally or alternatively include any other suitable set of components. The system functions to traverse within a support frame 200. Additionally or alternatively, the system 100 can structurally support and/or a transport payload (e.g., shipping pallet), such as on the optional support tray 10 (e.g., which may be actuated/locked into the support frame). However, the system can provide any other suitable functionalities.

In a specific example, the system 100 can be an Automated Storage and Retrieval System (AS/RS) robot configured to operate within an AS/RS ecosystem (e.g., storage within cell frame structure).

Further additionally or alternatively, the system 100 can include and/or interface with any or all of the components as described in: U.S. application Ser. No. 18/493,278, filed 24 Oct. 2023, and/or U.S. application Ser. No. 18/531,184, filed 6 Dec. 2023, each of which is incorporated in its entirety by this reference. Additionally or alternatively, the method can include any or all of the processes described in U.S. application Ser. No. 18/493,278, filed 24 Oct. 2023, and/or U.S. application Ser. No. 18/531,184, filed 6 Dec. 2023, each of which is incorporated in its entirety by this reference, or any other suitable processes performed in any suitable order.

The term "drive" and/or "drive mechanism" may be interchangeably utilized herein to refer to an electric drive-train (e.g., an electric drivetrain, including a traction/drive motor and power transmission components, gearboxes, etc.) and/or independent submodules thereof (e.g., for a split electric drivetrains with no mechanical coupling/differential, etc.), but can additionally or alternatively refer to any suitable tractive drive systems, powertrains/drivetrains, and/or power transmission schemes.

The term "substantially" as utilized herein can mean: exactly, approximately, within a predetermined threshold or tolerance, and/or have any other suitable meaning.

In variants, the vertical drive axis can be exactly vertical and/or concentric with an axis of a helical rack when engaged (and/or during traversal in Z) and constrained by the support structure. Additionally, it is understood that load bearing structures (e.g., arms of the deployment mechanism and/or mechanical components/suspension coupling the helical drive to the chassis) inherently deform under load. Likewise, frame structures may be warped over extended displacements (e.g., on the order of several centimeters over a full height of the frame). As such, in variants the vertical drive may be canted, with the axis skewed within the diagonal plane by several degrees (e.g., less than 10 degrees, less than 5 degrees, less than 2 degrees, etc.) when unloaded to accommodate the deformation and deflection under load. Accordingly, in variants these axes may be canted while still being substantially vertical (and/or substantially orthogonal to the deployment axis). For example, substantially vertical can mean: canted by less than 10 degrees, canted by less than 5 degrees, canted by less than 2 degrees, canted by less than 1 degrees, and/or exactly vertical in various configurations of the system. However, these term(s) can be otherwise suitably used/referenced.

1.1 Illustrative Examples

Figure 2A:
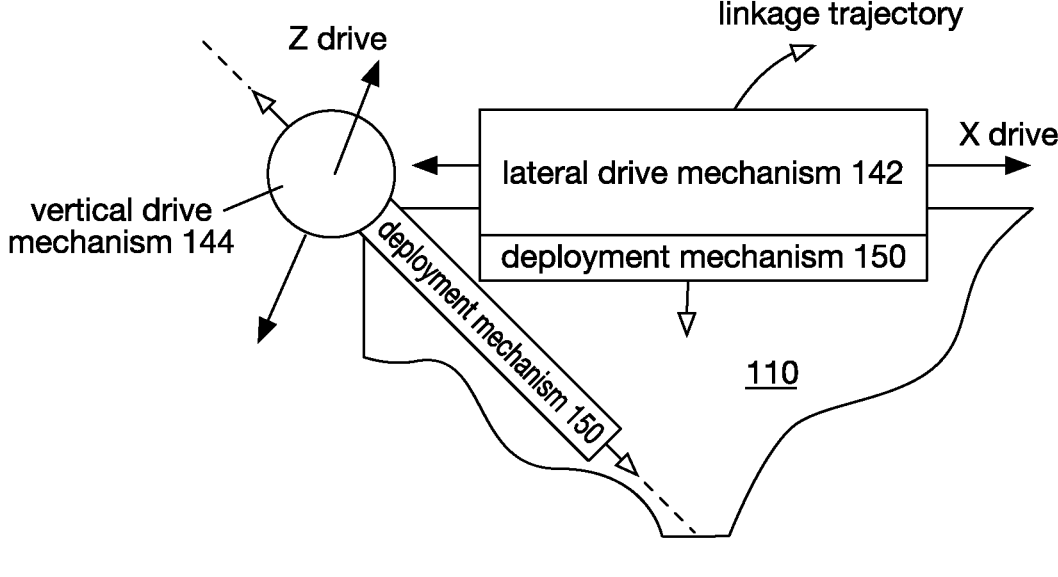
FIG. 2A is a partial schematic representation of a variant of the system from a top view.
Figure 2B:
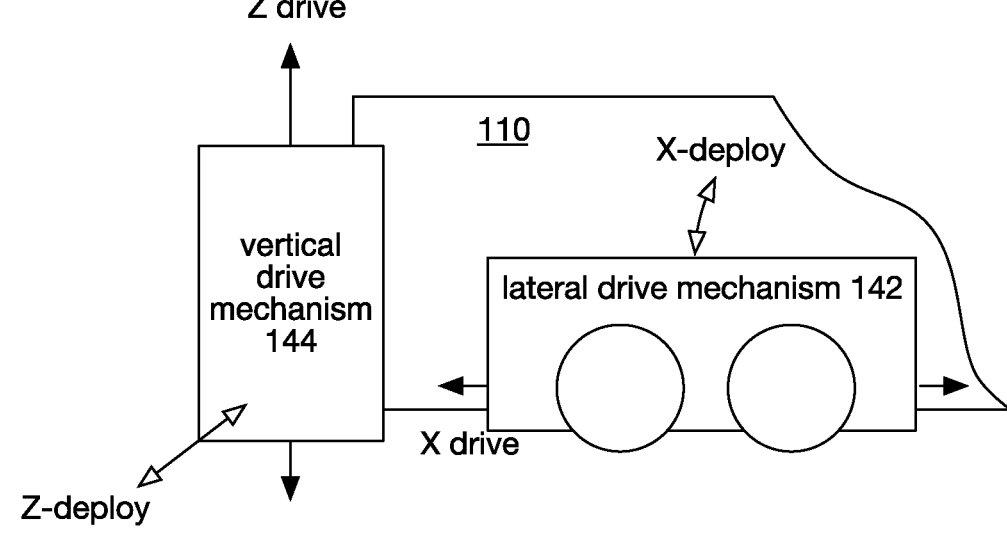
FIG. 2B is a partial schematic representation of a variant of the system from a side view.
Figures 3A, 3B:
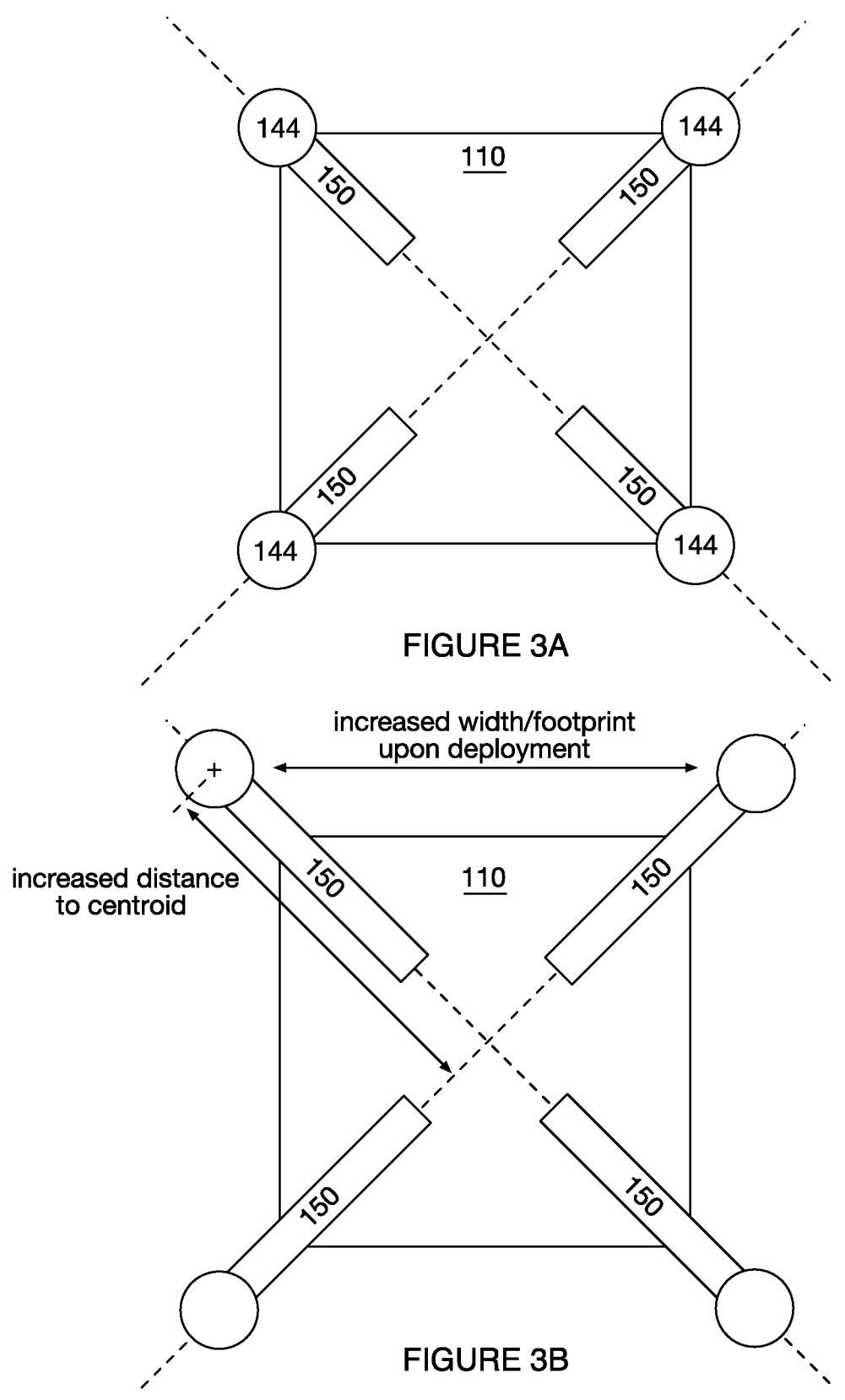
FIGS. 3A-3B are top-view schematic representations of a variant of a vertical-drive system in a first configuration and a second configuration, respectively.

A robot can include: a chassis, a computing system onboard the chassis, and a sensor suite communicatively coupled to the controller. The robot can include a plurality of orthogonal drive mechanisms (e.g., X-drive, Y-drive, Z-drive, etc.) controlled by an onboard computing system (and/or a controller thereof). Each orthogonal drive mechanism can be articulated between a retracted configuration and a deployed/engaged configuration by a (respective) set of deployment mechanisms. In a first example, two sets of (orthogonal) lateral drive mechanisms can be deployed using a respective set(s) of linkages (e.g., 4 bar linkage; actuated along an arcuate deployment trajectory by linkage transformation; an example is shown in FIGS. 2A-2B). For instance, first pair of lateral-drive mechanisms (e.g., X-drive mechanisms on opposing sides of a frontal plane; such as linear rail trolleys on a rail guided vehicle, etc.) can be independently actuated by a first and a second actuator along trajectories constrained by a first and second linkage, respectively (e.g., four bar linkage, with an anti-roll bar coupling sub-assemblies on opposing sides of the midsagittal plane). In a second example, a vertical drive mechanism(s) can be deployed at the corners of the chassis (e.g., deployed outward beyond a rectangular footprint defined by the lateral drive mechanisms and/or a planar intersection of the Y-drive mechanism travel and X-drive mechanism travel). Additionally, the robot can selectively deploy (i.e., disengage) and/or retract (i.e., engage) a payload and/or support tray thereof.

A method can include: traversing with a lateral-drive mechanism (e.g., controlling X-drive actuation and traversal; controlling Y-drive actuation and traversal); optionally controlling vertical-drive alignment (e.g., using feedback from the sensor suite); deploying a vertical-drive mechanism; retracting a lateral-drive mechanism (e.g., controlling X-deployment mechanism to retract X-drive; controlling Y-deployment mechanism to retract Y-drive; etc.); traversing with a vertical-drive mechanism; optionally controlling lateral-drive alignment (e.g., using feedback from the sensor suite); deploying a lateral-drive mechanism; and retracting a vertical-drive mechanism. The method can facilitate robot traversal along a plurality of orthogonal translation axes (e.g., X, Y, and Z degrees of freedom), wherein the robot traverses with one drive mechanism deployed (e.g., driving motion along the axis of traversal) and a remainder of the drive mechanisms retracted. Alternatively, the robot can traverse with any suitable drive mechanism(s) in any suitable configuration(s).

The robot can include any suitable degrees of actuation freedom, which can include: X-drive actuation, X deployment (and retraction) actuation, Y-drive actuation, Y deployment (and retraction) actuation, Z-drive actuation, Z deployment (and retraction) actuation, tray deployment actuation (e.g., controlling tray engagement/disengagement), and/or any other suitable degrees of freedom. Each degree of freedom can include a single actuator/mechanism or multiple (independent) actuators/mechanisms (e.g., two, four, etc.; a pairs of actuators, multiple pairs of actuators, etc.). In one example, the Z-drive can include a plurality of drive mechanisms (e.g., at each corner of the vertical footprint or column; four substantially parallel Z-drive axes) which can be independently actuated/controlled (e.g., simultaneously controlled to facilitate Z traversal while maintaining chassis orientation). In a first example, the robot can include four Z-drive actuators (e.g., all same-handed helical drives; two right-hand helical drives and two left-hand helical drives, paired diagonally or otherwise), each with a respective (linear) deployment actuator. In a second example, the robot can include four X-drive actuators, including: a front pair of two X-drive actuators (e.g., on opposing sides of a midsagittal plane) coupled by a linkage and collectively actuated by a front actuator; and a rear pair of two X-drive actuators (e.g., on opposing sides of a midsagittal plane) coupled by a linkage and collectively actuated by a rear actuator. In a third example, the robot can include four Y-drive actuators, including: a left pair of two Y-drive actuators (e.g., on opposing sides of a frontal plane) coupled by a linkage and collectively actuated by a left actuator; and a right pair of two Y-drive actuators (e.g., on opposing sides of a frontal plane) coupled by a linkage and collectively actuated by a right actuator.

In variants, the robot and/or degrees of actuator freedom thereof (or a subset thereof) can be rotationally symmetric about a vertical axis (e.g., 180 degree rotation, 90 degree rotation, etc.), mirrored about a midsagittal plane, mirrored about a (mid-)frontal plane, mirrored about a (diagonal) reference plane (e.g., defined by parallel rotational axes of opposite Z-drives, etc.), and/or can define any other suitable symmetry(ies).

However, the robot can include any other suitable degrees of freedom.

Figure 5:
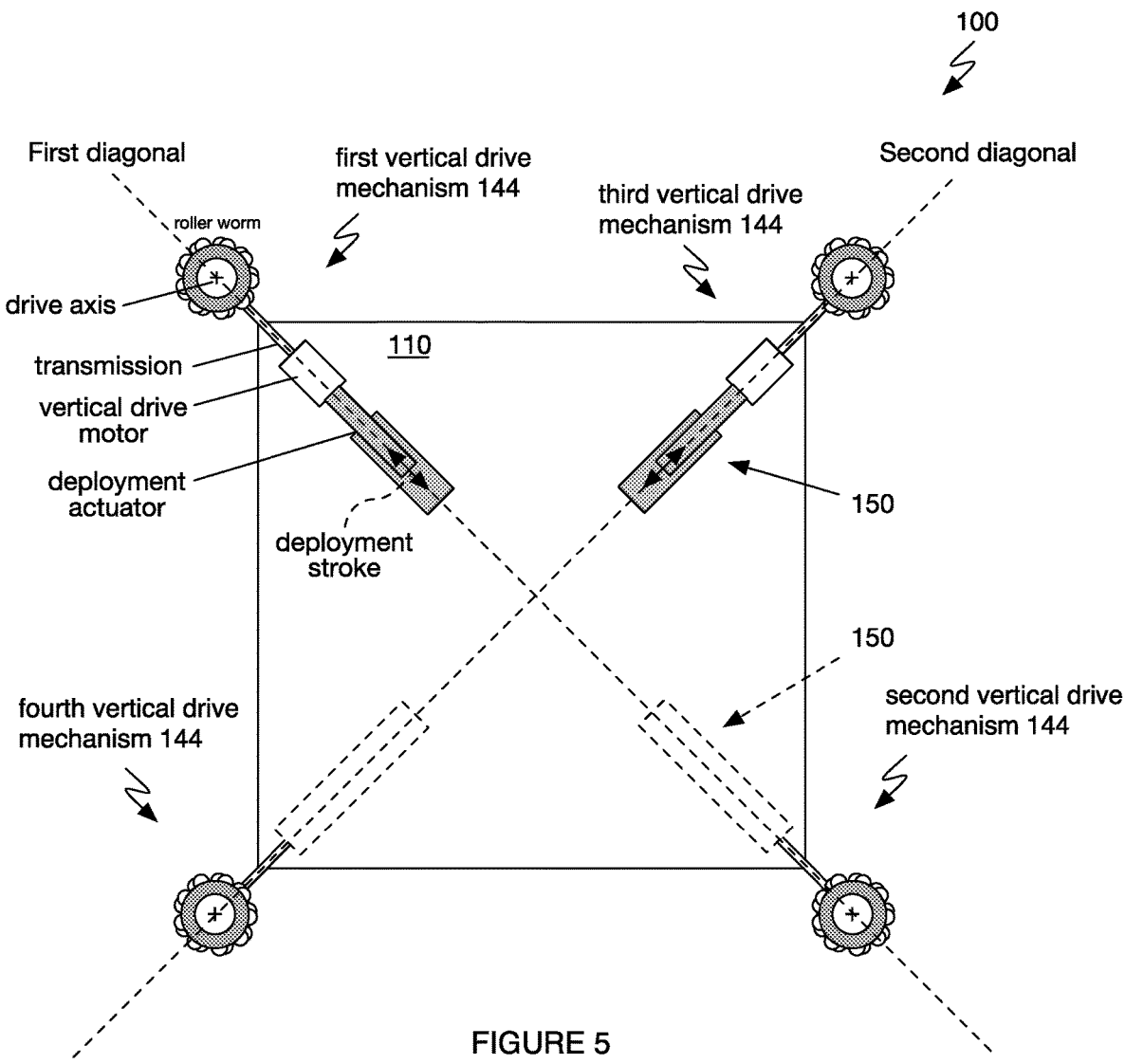
FIG. 5 is a top-view schematic representation of a variant of the system.
Figure 6:
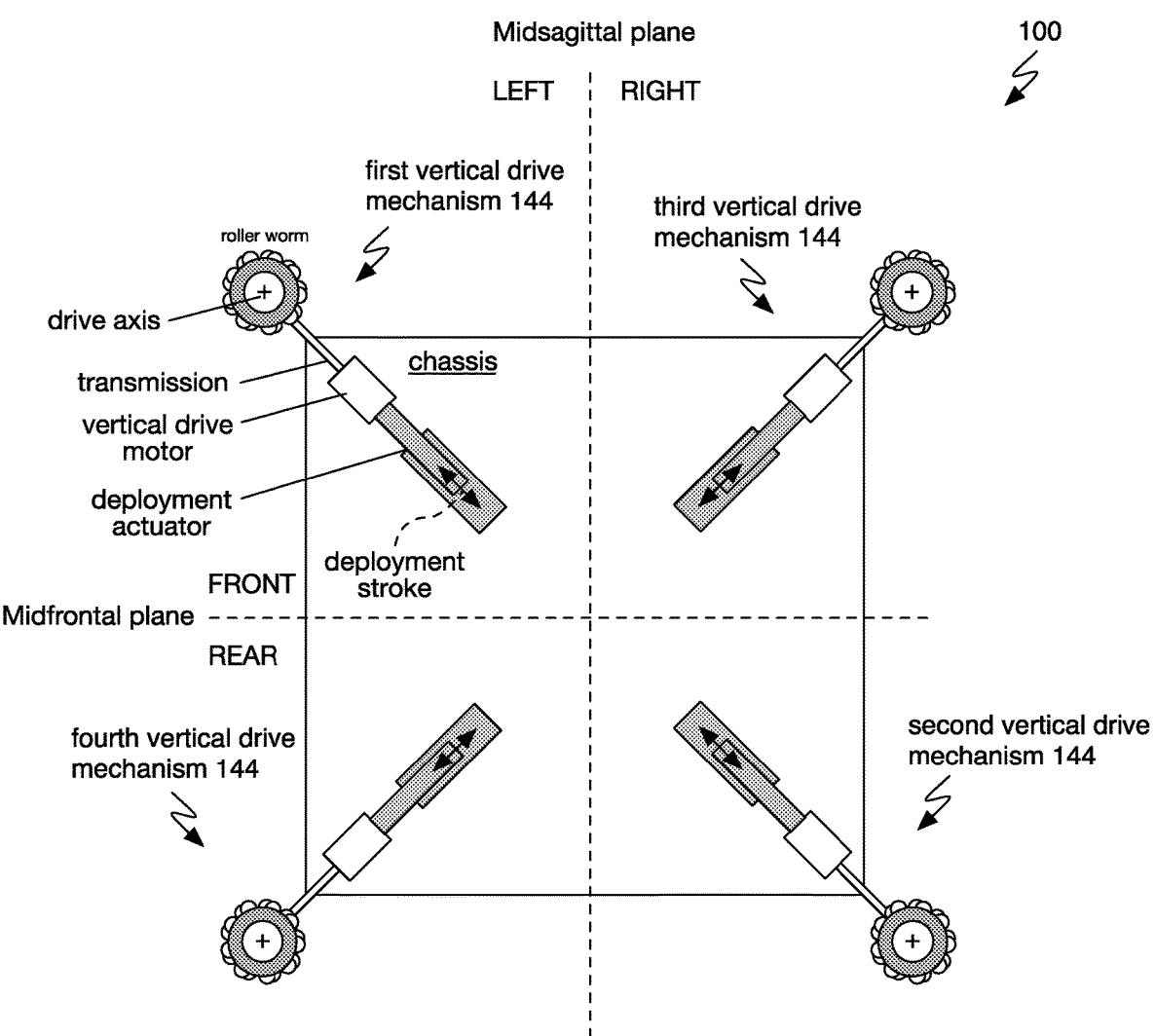
FIG. 6 is a top-view schematic representation of a variant of the system.
Figure 7A:
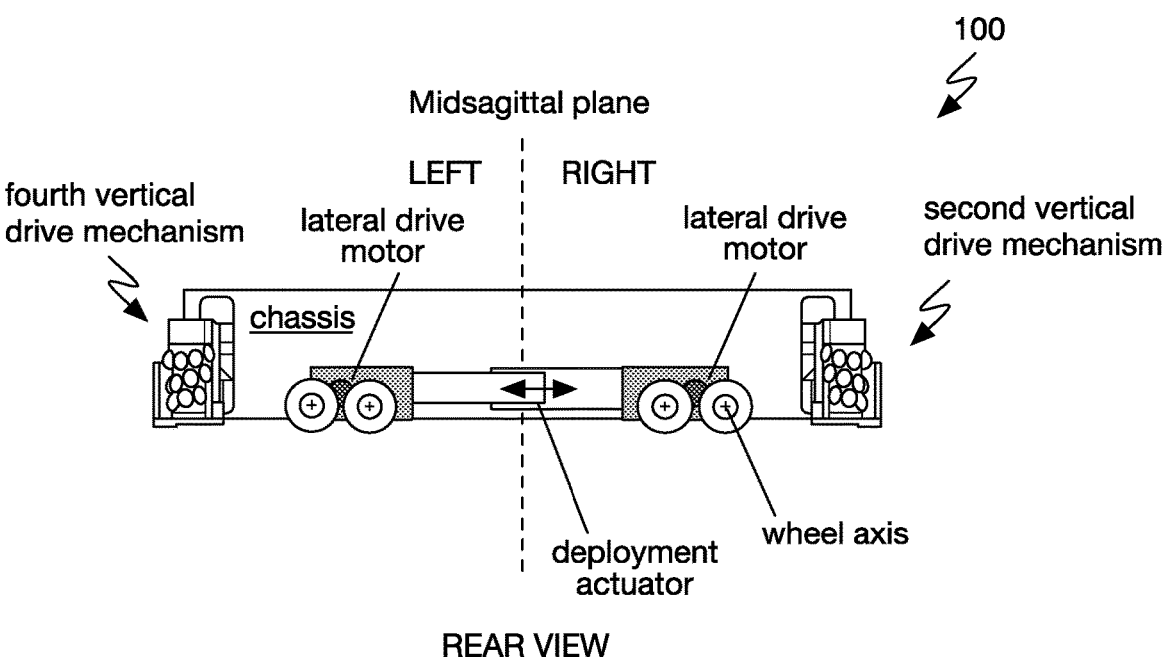
FIGS. 7A-7D are schematic representations of a variant of the system from a rear view, (left) side view, front view, and (right) side view, respectively.
Figure 7B:
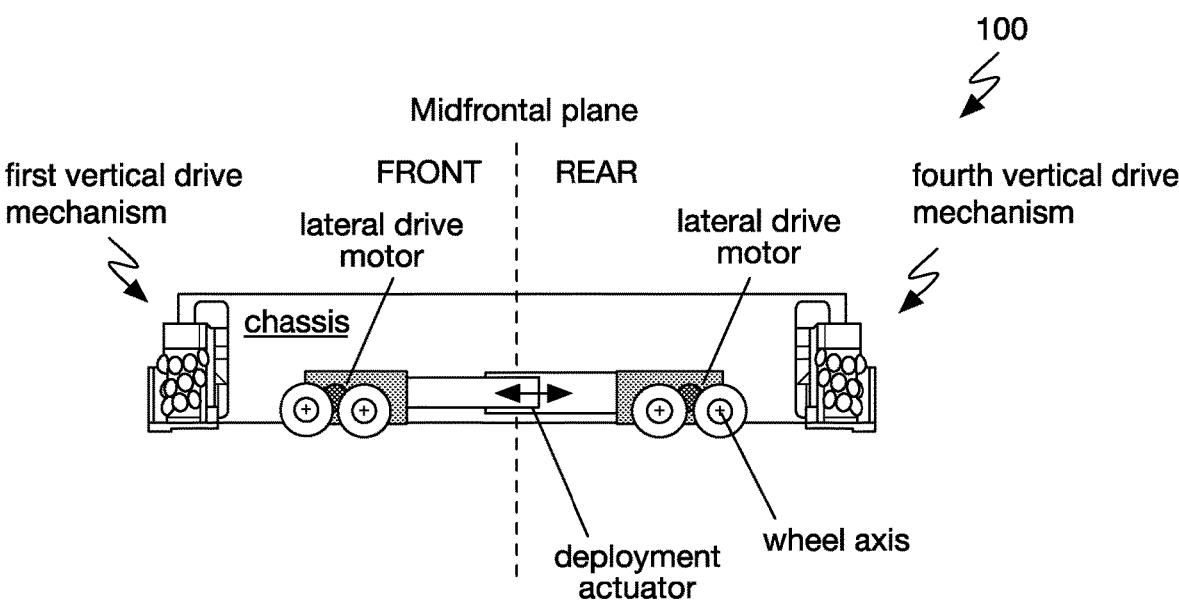
Figure 7C:
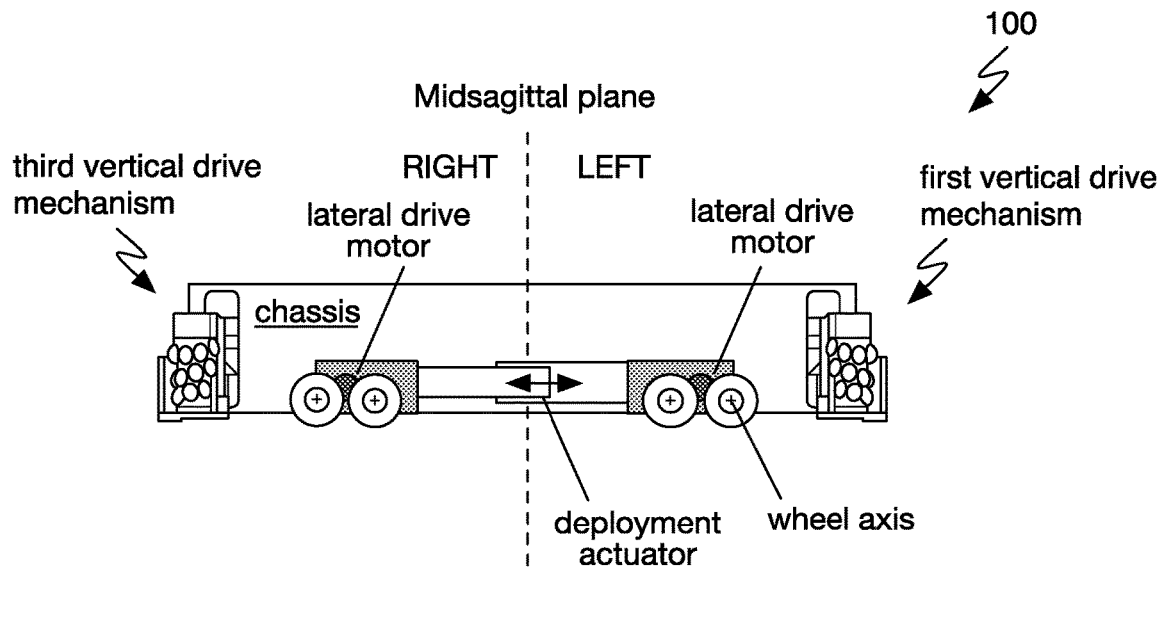
Figure 7D:
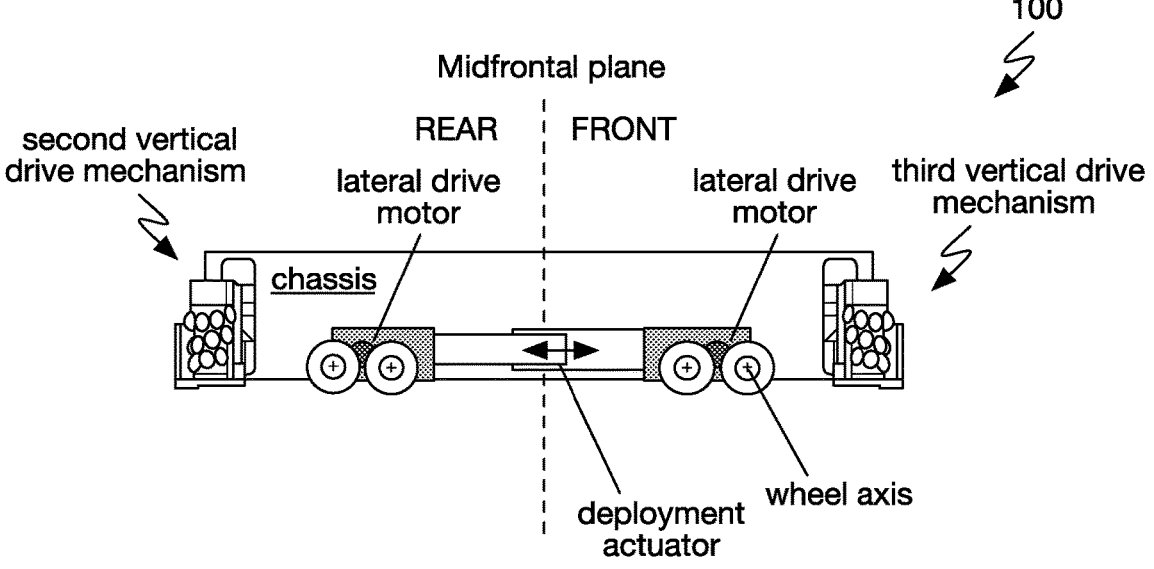

In a first variant (e.g., an example of which is shown in FIG. 5), an Automated Storage and Retrieval System (AS/RS) robot comprising: a chassis comprising a top plane, a first diagonal plane, and a second diagonal plane, wherein the intersection of the first diagonal plane and the second diagonal plane defines a vertical axis which is orthogonal to the top plane and comprises a centroid of the chassis; a first and a second pair of vertical drive mechanisms, each vertical drive mechanism comprising a roller worm defining a respective central axis which is parallel with the vertical axis, wherein the respective central axes of the first and second pairs of vertical drive mechanisms are within the first and second diagonal planes, respectively; a first actuator mounted to the chassis and coupled to at least one of the first pair of vertical drive mechanisms, wherein the first actuator is configured to change a first distance between the respective central axes of the roller worms of the first pair of vertical drive mechanisms; and a second actuator mounted to the chassis and coupled to at least one of the second pair of vertical drive mechanisms, wherein the second actuator is configured to change a second distance between the respective central axes of the roller worms of the second pair of vertical drive mechanisms.

The AS/RS robot can further comprise: a first traction drive comprising at least four wheels, each rotatable about a respective wheel axis which intersects the midsagittal plane; and a second traction drive comprising at least four wheels, each rotatable about a respective wheel axis which intersects the midfrontal plane. In a first example, each of the at least four wheels of the first traction drive are arranged on a left side of the midsagittal plane, wherein each of the at least four wheels of the second traction drive are arranged on a front side of the midfrontal plane. In a second example, an actuatable linkage coupling a first pair of wheels of the first traction drive to a second pair of wheels and to the frame, wherein a stroke of the actuatable linkage changes a distance between the first and second pairs of wheels, wherein the first and second pairs of wheels are coupled to a first traction motor and second traction motor, respectively.

Figures 19A, 19B:
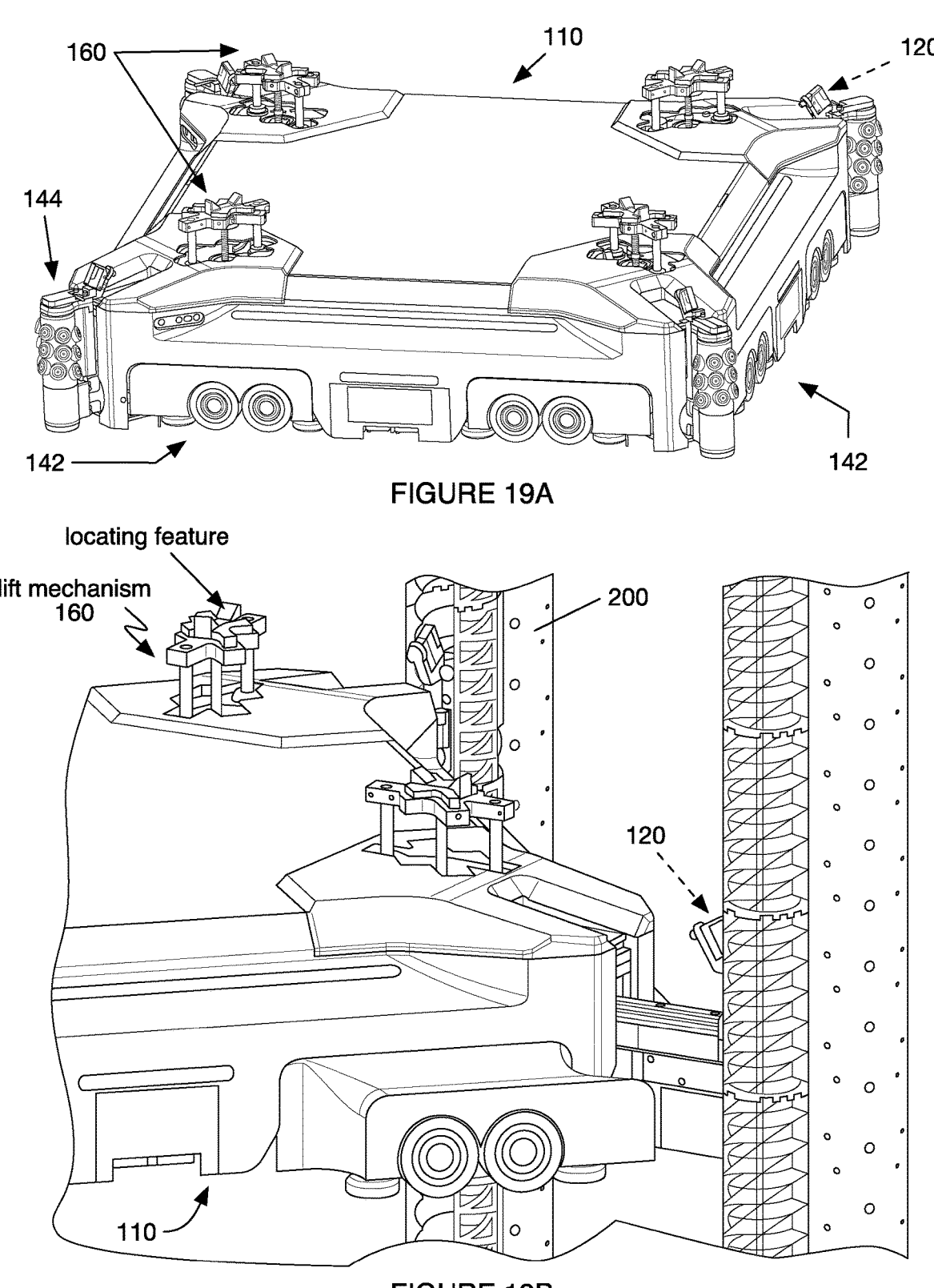
FIG. 19A is an isometric view of a variant of the system.
FIG. 19B a partial isometric view of a variant of the system in FIG. 19A, illustrating self-locating features on a tray lift mechanism within a support frame.

The AS/RS robot can further comprise a set of vertical lift mechanisms mounted to the frame, each defining a self-locating assembly feature at a superior surface (e.g., examples are shown in FIGS. 19A-19B). In a first example, the first and second diagonal planes intersect each of the vertical lift mechanisms. In a second example, nonexclusive with the first, a cell tray is supported by the superior surfaces of the self-locating assembly features of the set of vertical lift mechanisms, wherein the self-locating assembly features of the vertical lift mechanisms cooperatively constrain a yaw orientation of the cell tray about the vertical axis.

The AS/RS robot can be configured to operate within a rectilinear frame which defines a cell volume, wherein the first and second actuators are configured to transition the AS/RS robot between a first configuration, in which a first vertical projection of the roller worms of the vertical drive mechanisms is within a vertical projection of the cell, and a second configuration, in which a second vertical projection of the roller worms of the vertical drive mechanisms is outside of the vertical projection of the cell.

Figure 4A:
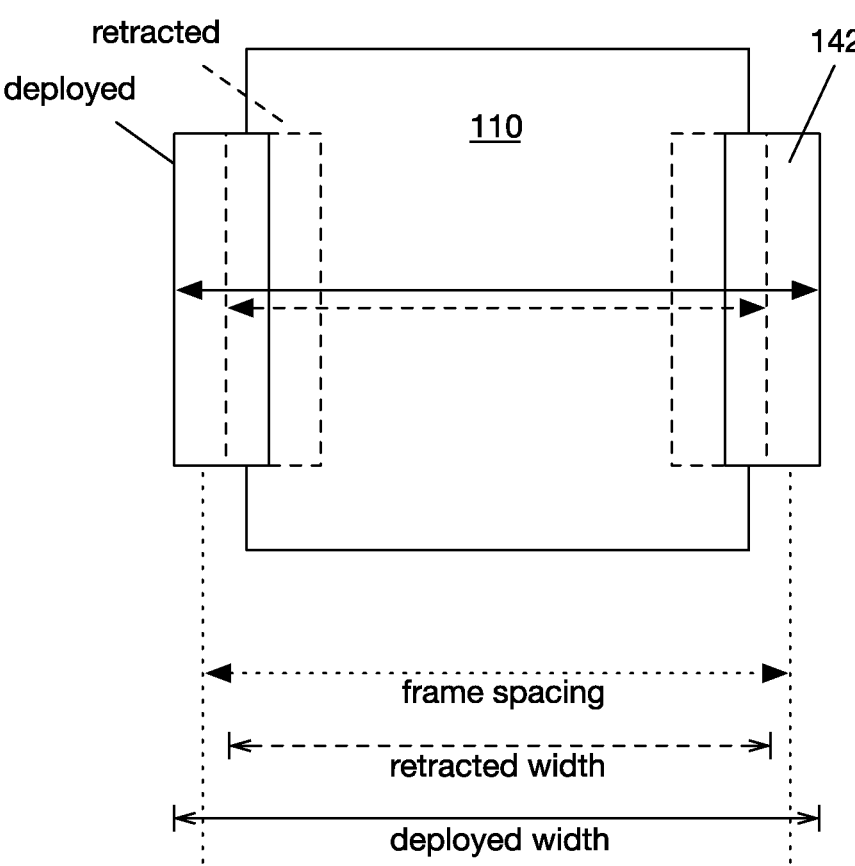
FIG. 4A is a top-view schematic representation of a variant of a lateral-drive system in a first configuration and a second configuration, respectively.
Figure 4B:
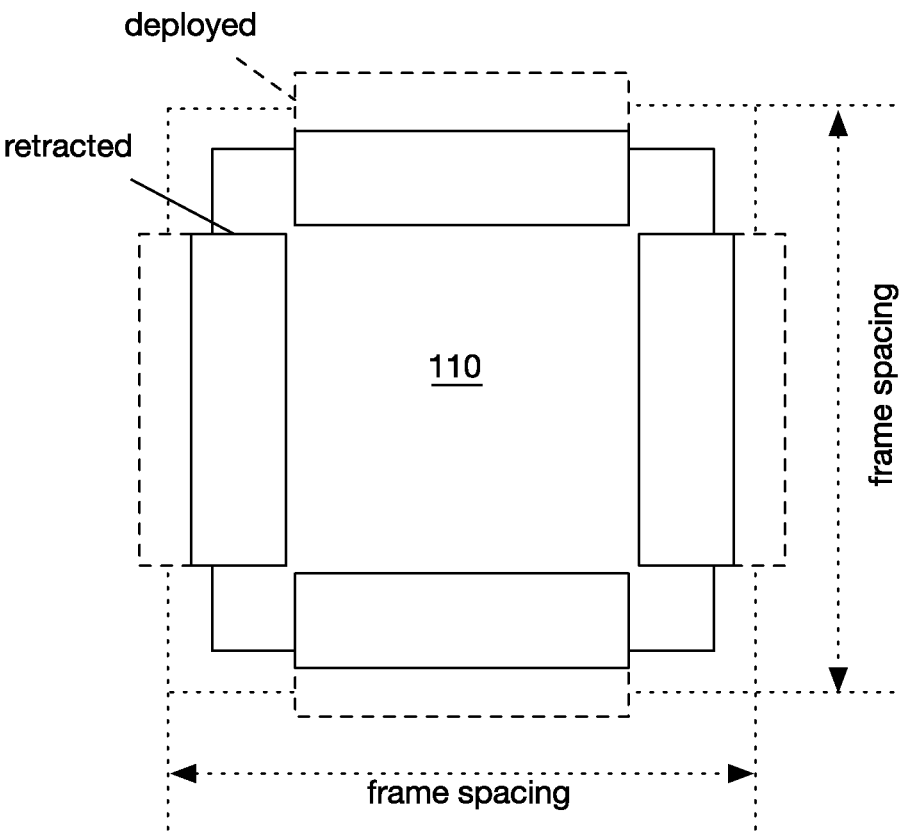
FIG. 4B is a top-view schematic representation of a variant of the system in a first configuration and a second configuration, respectively.

In second variant, examples of which is shown in FIG. 6, FIGS. 7A-7D, and FIG. 8) nonexclusive with the first, an Automated Storage and Retrieval System (AS/RS) robot comprising: a chassis defining a midfrontal plane and a midsagittal plane intersecting along a central axis, a reference plane orthogonal to the midfrontal plane and the midsagittal plane, wherein a reference area is defined within the reference plane; three drive systems defining orthogonal drive axes, each drive system comprising: a first motor arranged to the left of the midsagittal plane and forward of the midfrontal plane; a second motor arranged to the left of the midsagittal plane and rearward of the midfrontal plane; a third motor arranged to the right of the midsagittal plane and forward of the midfrontal plane; and a fourth motor arranged to the right of the midsagittal plane and forward of the midfrontal plane, wherein each of the first, second, third, and fourth actuators is configured to drive rotation of a respective body about a respective axis parallel with the respective drive axis of the drive system; and a set of deployment mechanisms coupling the drive systems to the chassis and configured to independently articulate each drive system between: a first configuration wherein an intersection of the reference plane and each of the respective bodies driven by the first, second, third, and fourth motors is a subset of the reference area; and a second configuration wherein each of the respective bodies of the first, second, third, and fourth motors does not intersect the reference area. For example, the reference area can be a vertical projection of an AS/RS cell (e.g., an example is shown in FIG. 4B).

In a third variant, nonexclusive with the first and second, an Automated Storage and Retrieval System (AS/RS) robot comprising: a chassis defining a vertical axis and four quadrants about the vertical axis; and within each quadrant: a helical drive mechanism comprising a first motor coupled to a roller worm with an axis of rotation parallel with the vertical axis; a first actuator coupled to the helical drive mechanism and configured to change a first distance between the axis of rotation of the roller worm and the vertical axis; lateral drive mechanism comprising a second motor and a wheel assembly coupled to the motor; and a linkage mounted to the chassis and coupling the lateral drive mechanism to the chassis, the linkage comprising a second actuator configured to change a second distance between the second motor and the vertical axis.

In the third variant, the AS/RS robot can further comprise: within each quadrant, an actuatable lift mechanism mounted to the chassis. In the third variant, the AS/RS robot can further comprise: an autonomous controller and a sensor suite comprising a plurality of perception sensors arranged within each quadrant.

In a fourth variant, an Automated Storage and Retrieval System (AS/RS) robot comprising: a chassis defining a primary axis; a set of deployment mechanisms coupled to the chassis; and two pairs of drive mechanisms onboard the chassis, each pair of drive mechanisms comprising a first and second roller worm which is extendable along a diagonal of the chassis by the set of deployment mechanisms, wherein a central axis of each roller worm is parallel with the primary axis.

However, the robot can be otherwise configured.

2. Benefits

Variations of the technology can afford several benefits and/or advantages.

Figure 14A:
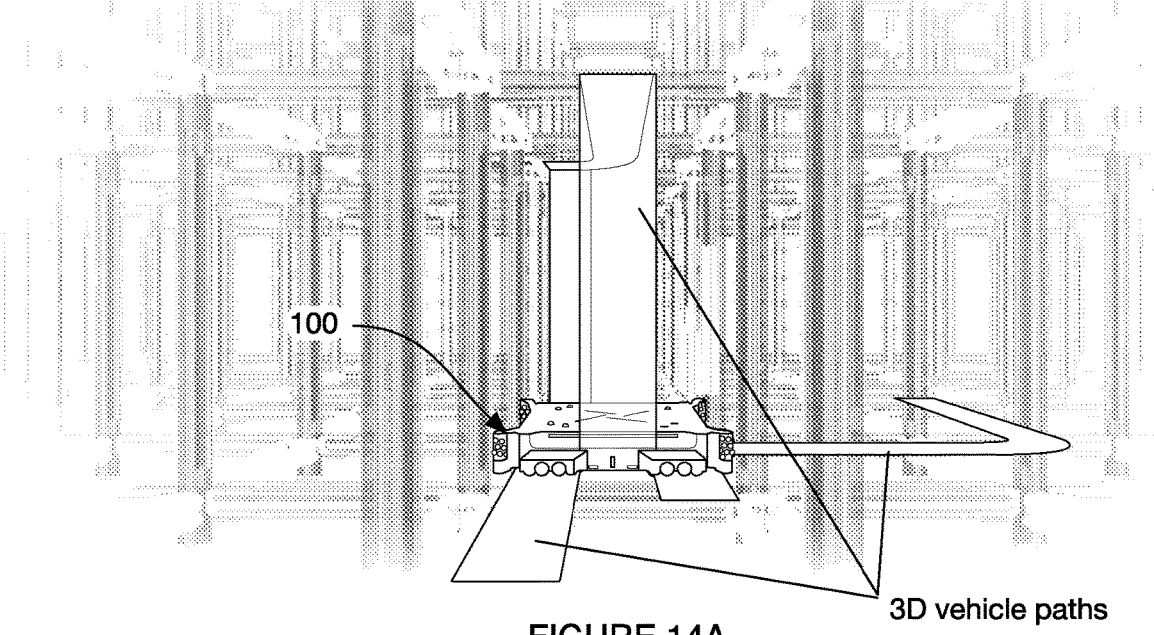
FIG. 14A is an example illustration of distinct vehicle paths in one or more variants of the system and/or method.
Figure 14B:
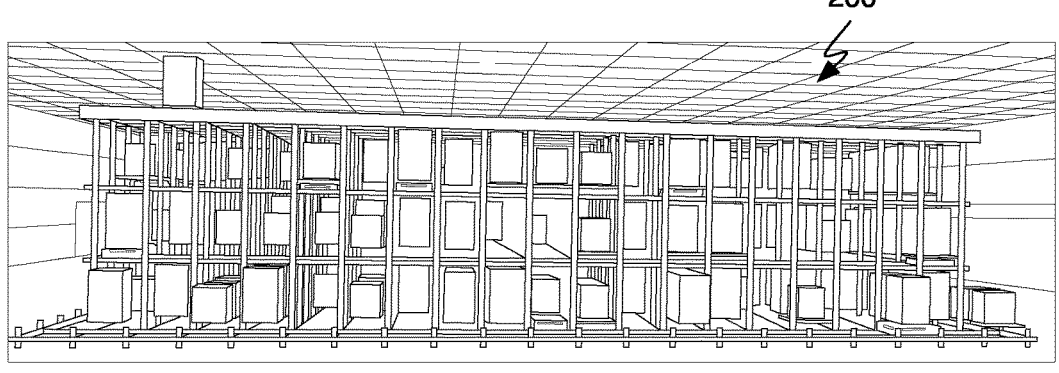
FIG. 14B is an example illustration of a support frame structure.

First, variations of this technology can facilitate payload translation in multiple (e.g., three) orthogonal axes, which can enable flexible routing within a 3D grid (e.g., enables traversal in a 2D array of parallel axes in each orthogonal plane) of a cell frame structure. Such variants can enable the robot to reach a grid cell(s) by many distinct 3D paths (e.g., an example is shown in FIG. 14A), which can be leveraged to increase storage density and/or operational efficiency in a cellular AS/RS ecosystem (e.g., an example is shown in FIG. 14B). For example, the system can facilitate operation as described in U.S. application Ser. No. 19/219,875, filed 27 May 2025, titled "DISCRETE ROLLER ASSEMBLY-BASED HELICAL DRIVE FOR TRANSLATION", U.S. application Ser. No. 19/205,835, filed 12 May 2025, titled "SYSTEM AND METHOD FOR UNIFIED MATERIAL STORAGE AND TRANSPORTATION", U.S. application Ser. No. 19/046,366, filed 5 Feb. 2025, titled "METHOD AND SYSTEM FOR CONTROL OF A VERTICALLY TRANSLATABLE ROBOT", and/or U.S. application Ser. No. 19/056,180, filed 18 Feb. 2025, titled "SYSTEM AND/ OR METHOD FOR DYNAMIC REBALANCING OF MULTI-RACK STORAGE," each of which is incorporated herein in its entirety by this reference.

Second, variations of this technology can enable multi-axis routing by reconfiguring the geometry and/or projected footprint of the robot (i.e., projection along the axis of translation) to allow clearance with the support frame struc-

Figure 15:
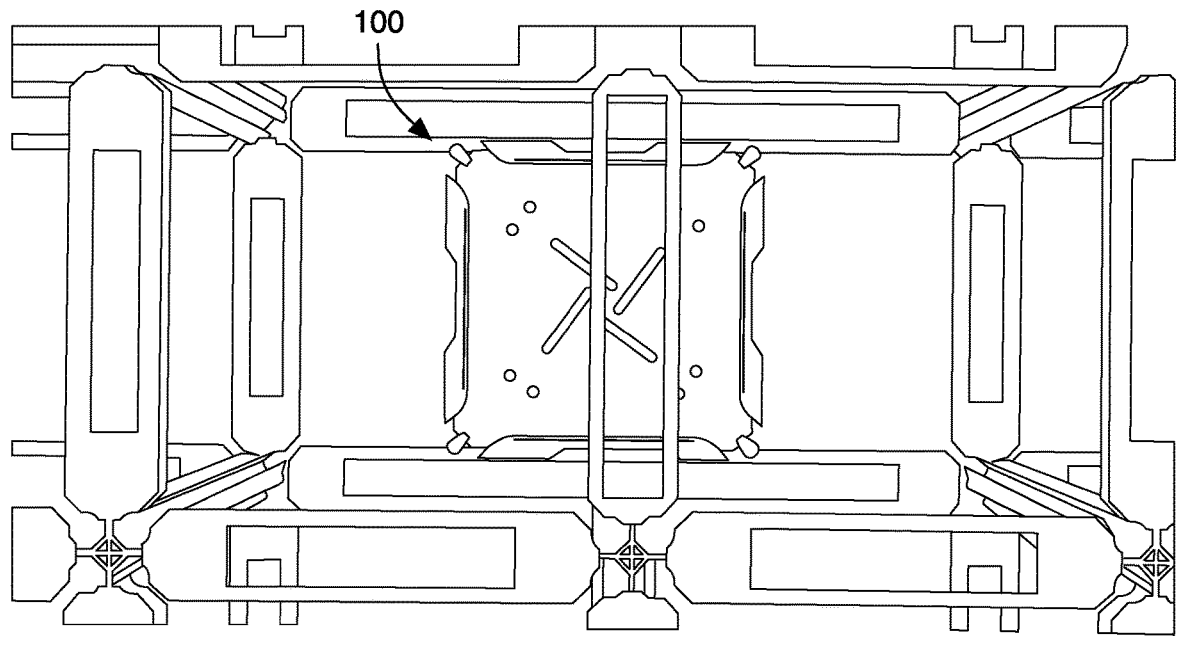
FIG. 15 is an example illustration of translation with a lateral drive mechanism in one variant of the system and/or method.
Figure 16:
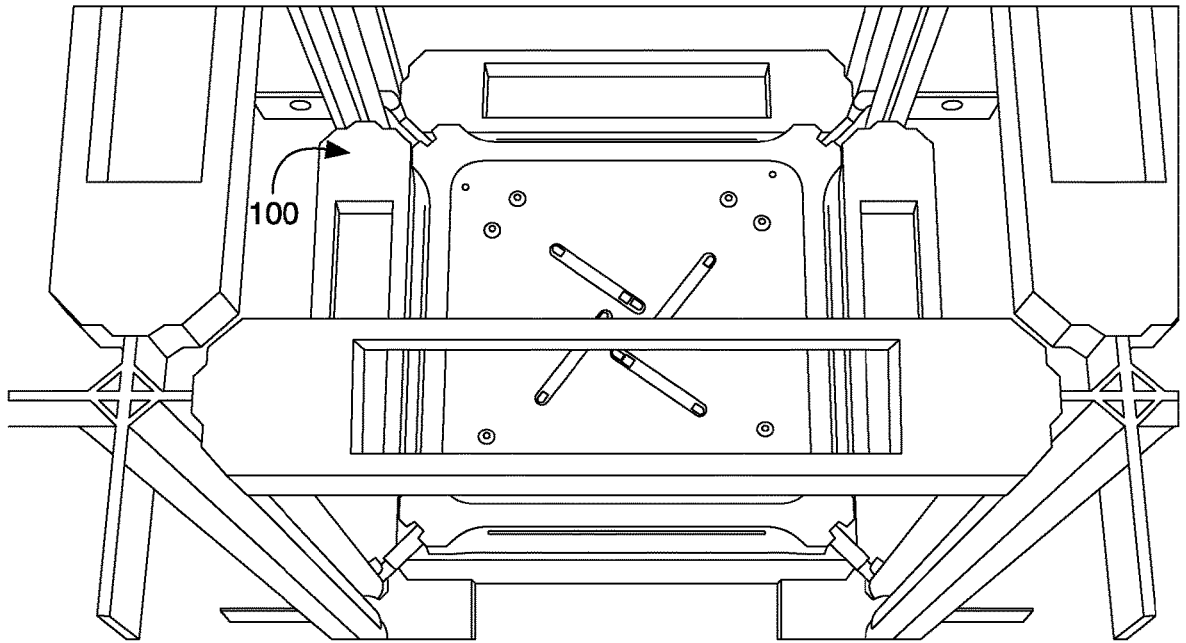
FIG. 16 is an example illustration of translation with a vertical drive mechanism in one variant of the system and/or method.

7 ture 200 (e.g., an example translation between cells of the frame structure is shown in FIG. 15). For instance, while traversing vertically along a Z-axis, such as using a helical drive mechanism, the lateral drive mechanism(s) can be retracted to allow clearance with the frame (e.g., an example is shown in FIGS. 4A-4B; a second example is shown in FIG. 16) and avoid incidental contact.

Figure 20:
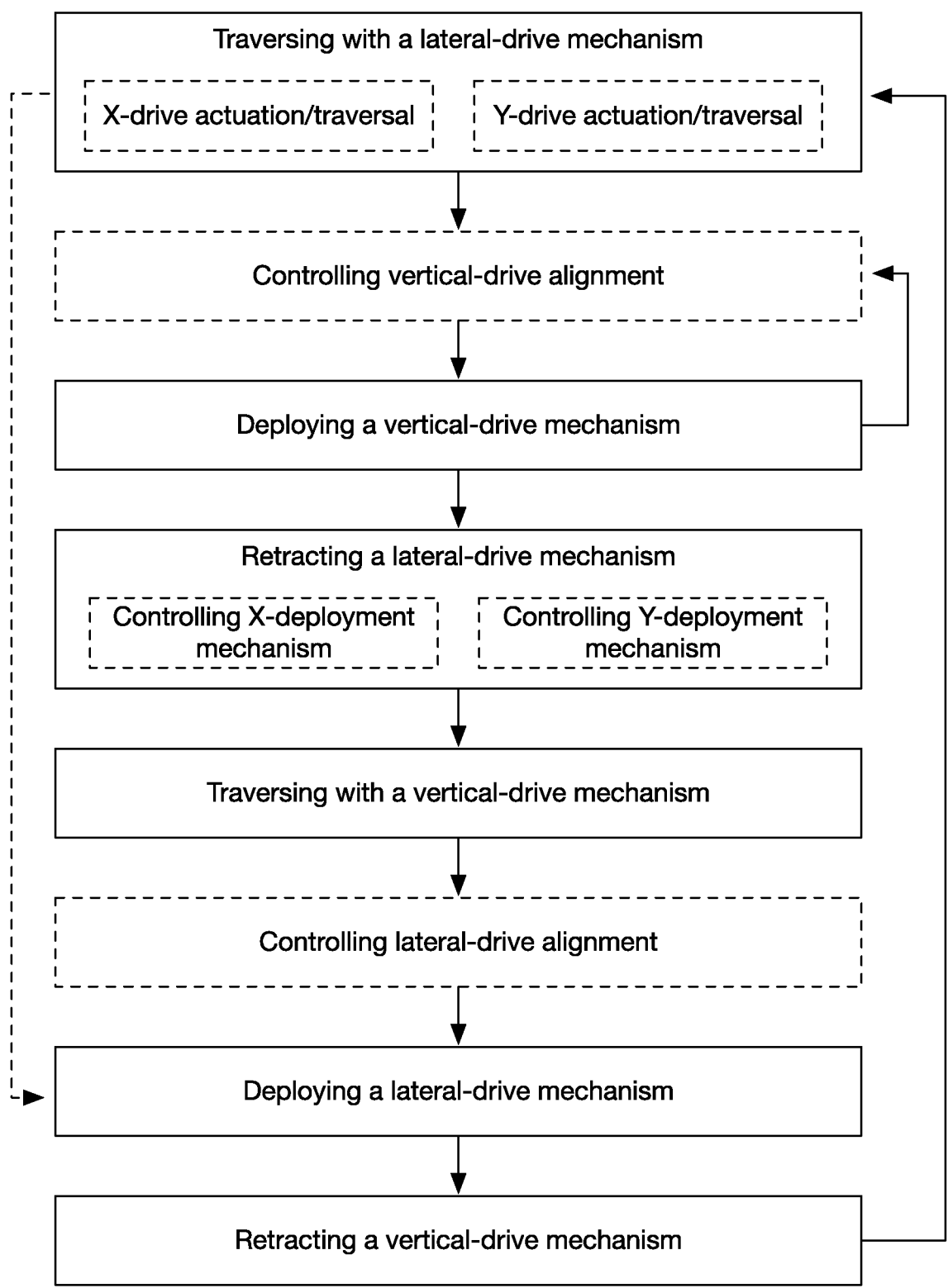
FIG. 20 is flowchart diagrammatic representation of a variant of the method.

Third, variations of this technology can facilitate control of the vehicle in each drive axis and/or can facilitate autonomous transitions between robot configurations and drive axes (e.g., an example is shown in FIG. 20).

Fourth, variations can reduce risks of autonomous traversal with passive safety measures (e.g., auto-braking in response to power loss, etc.) and a sensor suite which enables precise perception and control.

Fifth, variations can be agnostic to orientation (e.g., 90 degree and/or 180 degree rotational symmetry about vertical axis) and/or initial arrangement (e.g., ingress/egress positions) within a frame structure, which can increase flexibility of integration in various storage ecosystems.

Sixth, variations can enable deployment and/or independent articulation of (passive) storage trays (e.g., examples are shown in FIGS. 12, 17A-17B, and 18A-18C) so that a single robot can be used to transport multiple payloads within a frame. As an example, tray actuators can optionally enable granular tray manipulation independently of the primary drive and/or deployment actuators, such as to allow engagement and/or disengagement from the frame.

However, variations of the technology can additionally or alternately provide any other suitable benefits and/or advantages.

3. System

The robot system 100 can include: a chassis 110, sensor suite 120, computing system 130, a set of drive mechanisms 140, a set of deployment mechanisms 150, and/or any other suitable components. The system 100 can optionally include a support tray 10 (a.k.a., cell tray) and a set of tray actuators 160. However, the system 100 can additionally or alternatively include any other suitable set of components. The system functions to traverse within a support frame 200. Additionally or alternatively, the system 100 can structurally support and/or a transport payload (e.g., shipping pallet), such as on the optional support tray 10 (e.g., which may be actuated/locked into the support frame). However, the system can provide any other suitable functionalities.

3.1 Chassis

The chassis 110 functions to structurally support and/or transport a payload (e.g., shipping pallet), such as on the optional support tray. The chassis additionally functions to facilitate traversal within a 3D cell grid. The chassis is preferably substantially rigid (e.g., deformation tolerance stack-up less than threshold at maximum load and/or edge case load distribution), but can additionally or alternatively be constructed from materials such as metal alloys (e.g., rolled steel), composite, plastics, and/or any other suitable materials. For example, the chassis can be constructed from a rolled steel frame assembly (e.g., assembled with threaded fasteners, rivets, etc.) and/or can be a unibody structure (e.g., unitary weldment, composite structure, etc.). The chassis can include mounting points for attaching other components and/or can be mechanically coupled to (or structurally support) the computing system, sensors, drive mechanisms, deployment mechanisms, and/or any other suitable compo-

Figure 8:
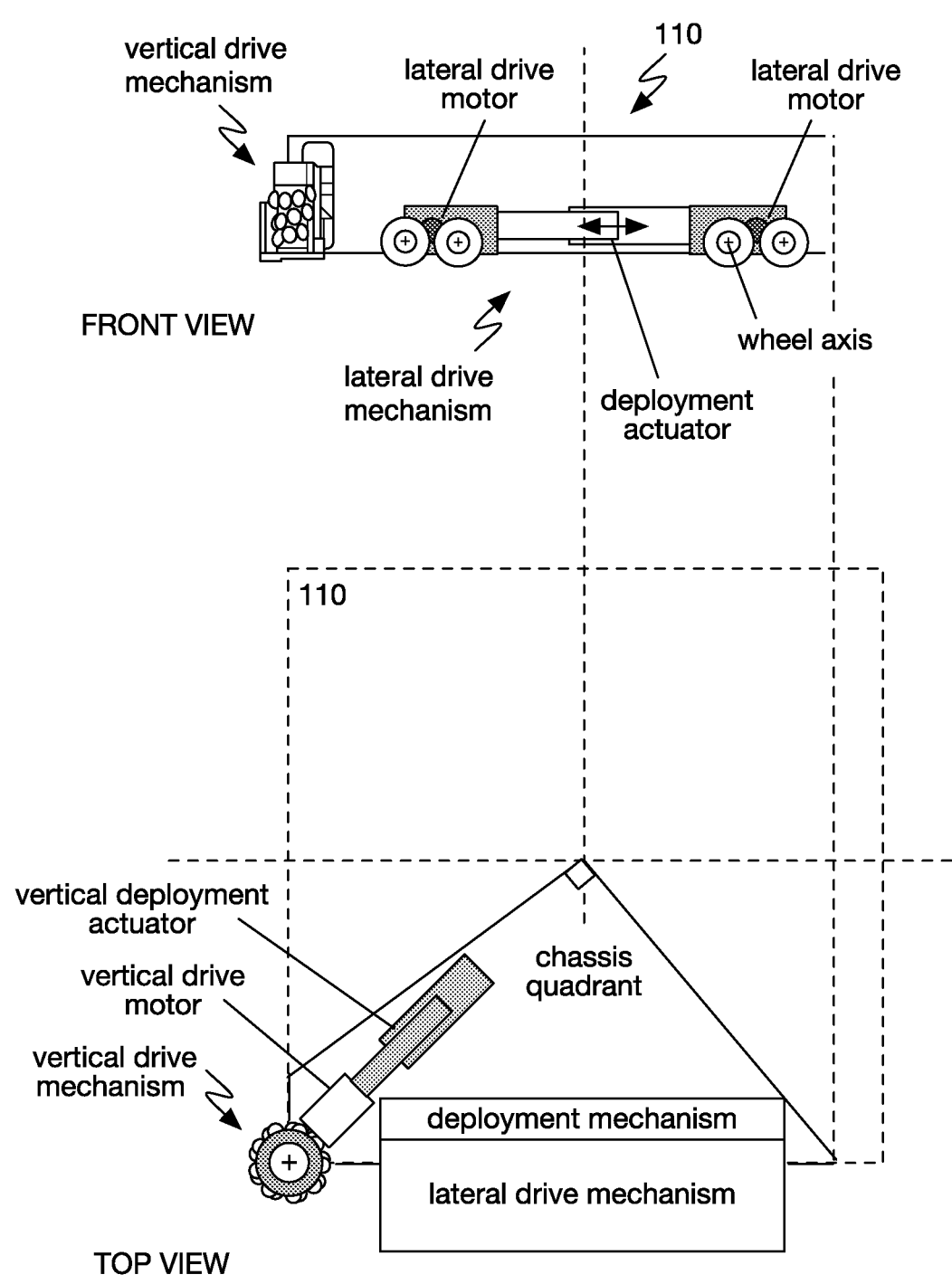
FIG. 8 is a partial schematic representation of a variant of the system, illustrating a quadrant of the chassis in a front view and top view.

8 nents. In variants, hardware components/subsystems can be modularly assembled to the chassis in substantially rotationally symmetry quadrants (e.g., along axes of symmetry or a rotation thereof, such as a 45 degree rotation of the midsagittal and midfrontal planes about the axis of intersection; between diagonals, an example of which is shown in FIG. 8), and/or can be otherwise coupled to the support structure (e.g., centrally mounted battery, computing system, etc.). However, the chassis may be otherwise configured.

The chassis 110 can include and/or define a set of diagonals (e.g., between opposing pairs of vertical drive axes, intersecting along a vertical axis including the centroid), with structural loads from the cell tray and/or drive mechanism (suspensions) being mounted and/or supported proximal to the diagonals (e.g., within 5 cm, within 2 cm, mounting points and chassis nodes along the diagonals, etc.). For example, the chassis can include four cell tray support interfaces (e.g., passive support surfaces, actuatable supports, vertical lifts, self-locating features, etc.), each arranged substantially along a diagonal of the chassis. Likewise, the mounting structures for each drive mechanism and each deployment mechanism are preferably proximal to the chassis diagonals, but can be otherwise configured.

In variants, the chassis can house an onboard power source which functions to power onboard components (e.g., actuators, sensor suite, etc.). The power source can be: a set of electrical/charging contacts (e.g., rail contacts for an electrified frame), a battery, a fuel conversion system (e.g., a fuel cell and fuel storage, etc.), a combination thereof, and/or any other power source(s). The system can include one or more power sources. The power source is preferably mounted to the vehicle (e.g., chassis), but can alternatively be mounted to tray, located offboard the vehicle, or be otherwise arranged.

In variants, a battery functions to store electrochemical energy in a rechargeable manner and/or can function to supply electrical energy to the system. The battery preferably includes a lithium-based battery chemistry, which can include: a lithium-ion battery, lithium cobalt oxide battery, a lithium ion manganese oxide battery, a lithium ion polymer battery, a lithium iron phosphate battery, a lithium-sulfur battery, a lithium-titanate battery, a thin film lithium ion battery, a lithium ceramic battery, and/or any other suitable lithium-based battery chemistry. However, the battery(ies) can include any other suitable chemistry for the storage and release of electrical energy, such as sodium-ion batteries and/or any other suitable batteries. The battery can have an energy storage capacity of: less than 1 kWh, 1 kWh, 5 kWh, 10 kWh, 20 kWh, 30 kWh, 50 kWh, 70 kWh, 100 kWh, greater than 100 kWh, any open or closed range bounded by the aforementioned values, and/or any other suitable storage capacity. However, the system can include any other suitable battery(ies), which can power the drive mechanism(s) and/or actuators of the system. Alternatively, the system can otherwise exclude batteries, such as when electrically coupled to an electrified (e.g., third rail style) frame structure, and/or the system can include any other suitable power source(s).

In one variant, actuators deployment mechanism(s) may be actively powered to maintain a retracted state. Additionally or alternatively, deployment mechanisms and/or drive mechanisms can be semi-stable (e.g., passively return to a first/deployed configuration, such as in response to power and/or communication loss; passive stop in response to power loss), bi-stable (e.g., maintained in static equilibrium when deployed or retracted in absence of supplied power), passively stable/locked (e.g., internal friction and/or static normal force maintains static equilibrium in absence of supplied power; brakes passively applied in absence of power) and/or can be otherwise configured. For example, when traversing vertically (e.g., along Z axis with a helical Z-drive mechanism), power-loss may cause the deployment mechanism for the vertical drive to passively maintain normal force between the system and a support frame (e.g., each Z-drive contacting the frame), passively prevent back driving, lock due to passive braking (e.g., along power transmission) and/or otherwise maintain static stability of the system in all configurations (and/or each liminal deployment position therebetween). For example, the helical drive and/or roller worms thereof may be passively stable when under load (i.e., supporting the robot, retained against the helical rack) and remain (passively) compressed against the helical rack by the deployment mechanism (and/or a spring thereof) in a power-loss scenario.

However, the actuator deployment mechanism(s) can be otherwise configured.

3.2 Sensors

The sensor suite 120 functions to collect measurements for feedback controls and can additionally function to facilitate autonomous perception and control of the robot system. The sensor suite can include: internal sensors (e.g., encoders, actuator sensors, accelerometers, gyroscopes, IMU, INS, temperature sensors, voltage/current sensors, etc.), environmental sensors, antennas (e.g., GPS, cellular, Bluetooth, Wi-Fi, Near Field Communication, etc.), drive mechanism sensors (e.g., encoders, cameras, time-of-flight sensors, voltage/current sensors, accelerometers, force sensors, contact sensors, etc.; inboard and/or outboard ends, such as encoders at both the actuator and the wheel), wheel encoders, deployment mechanism sensors (e.g., position sensing, etc.), payload sensors (e.g., force sensors/switches, cameras, proximity sensors, payload envelope sensors, payload engagement sensors, etc.), perception suite sensors (e.g., cameras, time-of-flight sensors, proximity sensors, ultrasonic, Radar, LiDAR, etc.; support frame sensors, etc.), integrated actuator sensors, and/or any other suitable set of sensors. The sensors can include one or more: Radar sensors, LiDAR sensors, cameras, camera arrays, time-of-flight sensors, time-of-flight arrays, spatial sensors, location sensors, force sensors, on-board diagnostic sensors (such as vehicle mechanism sensors), audio sensors, barometers, light sensors, temperature sensors, current sensors, voltmeters, contact sensors, proximity sensors, vibration sensors, ultrasound sensors, electrical sensors, pressure sensors, and/or any other suitable sensors. However, the electric vehicle can include any other suitable sensors.

In variants, one or more sensors of the sensor suite and/or perception suite thereof can be arranged on each side of the vehicle (e.g., front, back, left, right; top and bottom; etc.) and/or oriented along each axis of the vehicle (e.g., X, Y, Z; in opposing directions etc.). In a first example, the sensor package or a subset thereof can be substantially rotationally symmetric about the central axis (e.g., 90 degree rotational symmetry). In a second example, perception sensors can include a field of view spanning each lateral drive axis. In a third example, the sensors of the vehicle are symmetric about a frontal-midplane (e.g., front set of sensors symmetric with a rear set of sensors) and/or a midsagittal plane (e.g., left set of sensors symmetric with a right set of sensors) and/or a diagonal plane (e.g., between parallel helical drive axes; aligned with the arms of the Z-drive deployment mechanism). In a fourth example, payload engagement sensors (e.g., validating engagement of payload/tray) and/or payload envelope sensors (e.g., validating payload satisfies the envelope constraints in each dimension) can be arranged at a superior surface of the system.

In variants, the sensor suite can include a set of Z-axis sensors (e.g., arranged at an outboard/actuated drive end of the Z-deployment mechanism) at each Z-drive mechanism. For example, the Z-drive sensors can include: contact sensors (e.g., which physically contact the frame structure) and/or non-contact sensors (e.g., cameras, light sensors, optical sensors, laser imaging sensors, time-of-flight sensors, etc.) configured to facilitate alignment and/or engagement of the Z-drive mechanism with the frame structure (e.g., helical drive interface). Z-axis sensors can be used to provide feedback on (and/or estimate): vertical position along the support structure (e.g., absolute, such as relative to fiducials; relative to features, helical orientation, etc.), orientation (e.g., Z-drive orientation in yaw and/or rotation about drive axis), and/or any other suitable parameters. As an example, Z-axis sensors can include non-contact sensors with a field-of-view spanning the (vertical) axis of rotation of the Z-drive mechanism (e.g., helical drive axis, multi-roller wheel axis, etc.). As a second example, Z-axis sensors can be arranged within the diagonal planes (e.g., extending between opposite Z-drives and/or Z-deployment mechanisms) of the robot. In a third example, during vertical translation, the volume swept by translation of the Z-axis sensors can intersect a volume swept by the multi-roller wheel assembly. In a fourth example, vertical footprint of Z-axis sensors can intersect a vertical footprint of the Z-drive mechanism and/or a multi-roller wheel assembly thereof. However, Z-axis sensors can be otherwise configured.

Additionally, sensors can provide validation feedback, sensing: engagement of a payload tray, payload mass, payload dimension(s), payload footprint (e.g., in one or more axes), payload envelope, communication integrity, coordinate position (e.g., in X, Y, and/or X; or higher order derivatives thereof: velocity, acceleration, jerk, etc.), incline angle (e.g., pitch, roll, etc.), and/or any other suitable parameters.

The sensor suite can additionally or alternatively facilitate object detection and/or collision avoidance (e.g., with other robots within the structure, etc.). Additionally or alternatively, the sensor suit can facilitate odometry, localization relative to frame features (e.g., cells and/or coordinate positions therein; helical rack geometry; fiducials; etc.), dead reckoning, and/or can otherwise facilitate localization within the frame structure. The sensors are preferably communicatively coupled to the computing system to facilitate perception and/or control. For instance, the sensor suite can be configured to collect data at various frequencies and/or resolutions, depending on the specific requirements of the operating environment. The collected data can be processed and analyzed in real-time (or near real time) to inform the autonomous decision-making and control at the computing system.

In a first variant, each quadrant and/or side of the robot can include a time-of-flight array to sense the rails and/or flanges of the frame to facilitate alignment/deployment of the lateral drive(s).

In a second variant, each quadrant can include stereo-cameras and/or monocular cameras to facilitate orientation and alignment of the vertical drives with the rack(s).

However, the system can include any other suitable sensor suite and/or any other suitable sensor(s).

3.3 Drive Mechanism(s)

The drive mechanisms 140 function to drive traversal along an axis (e.g., one of three orthogonal axes; X, Y, Z).

Figure 11:
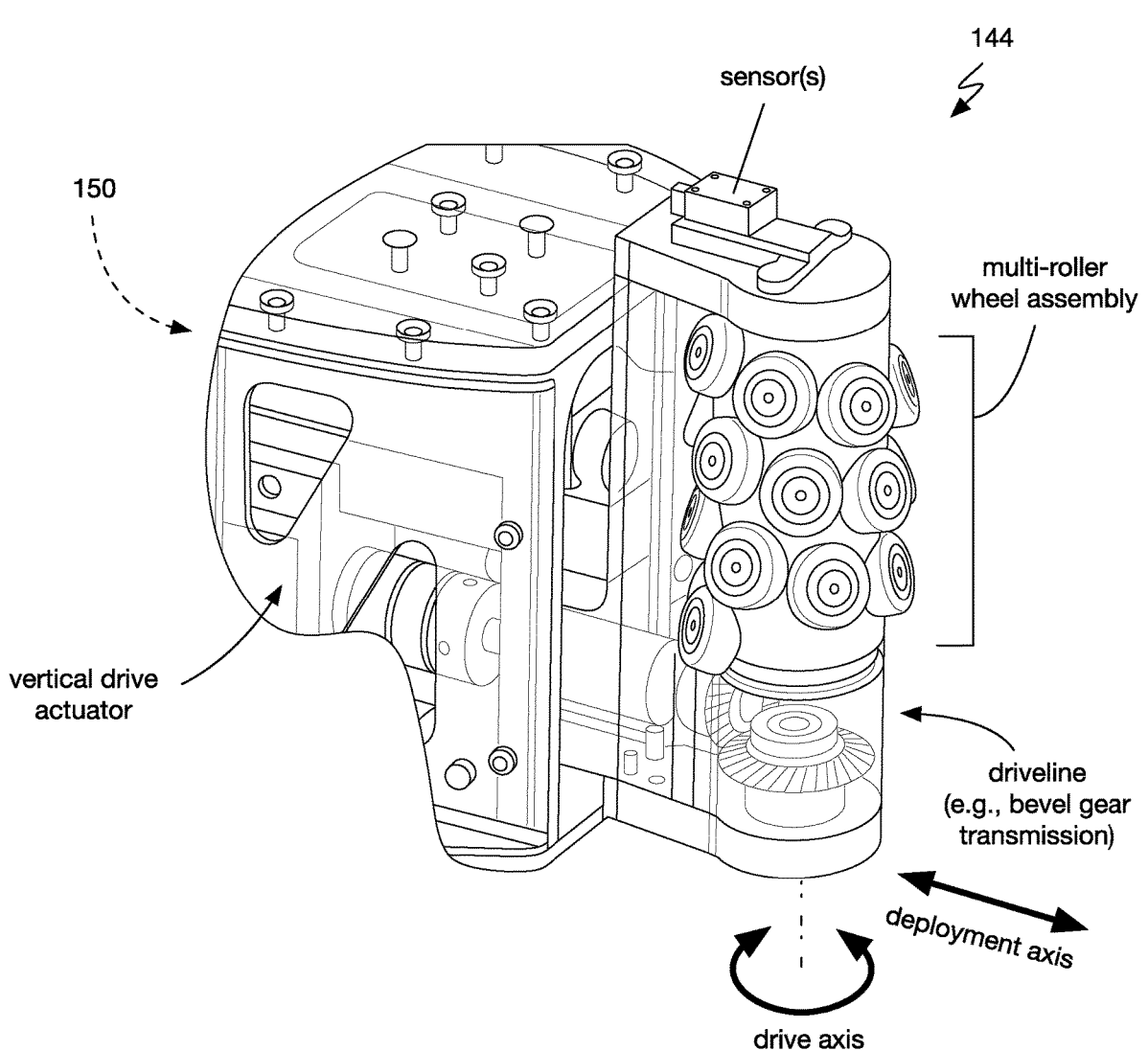
FIG. 11 is a partial isometric view of an example vertical drive mechanism in one or more variants of the system.

Each drive mechanism is preferably mounted to the distal end of the deployment mechanism (e.g., coupling the drive mechanism to the frame, such as proximal to a diagonal of the frame), but can additionally or alternatively be directly or indirectly coupled to the frame. Each drive mechanism is preferably communicatively coupled to the computing system (and/or an actuator controller/driver thereof) and powered by the chassis power source (e.g., battery), but can be otherwise configured. Drive mechanisms can include: rail trolleys/carriages, track drive systems (e.g., rail bogie; V-groove track systems, etc.), rack drive systems (e.g., rack-and-pinion), helical drive systems (e.g., helical omni-wheels, such as a roller worm), parallel wheel sets (e.g., driven, undriven; suspended, unsuspended; fixed axle, split axle, multi-axle, etc.; two, three four, more than four, etc.), automotive drivetrains, belt drive, cable drives, and/or any other suitable types of drive mechanisms. The drive mechanisms can include wheels which can be: cylindrical, tapered, non-tapered, spherical, grooved, non-grooved, pneumatic, rubberized (e.g., compressible traction layer), rigid, semi-rigid, compressible, driving (e.g., powered by tractive motor), non-driving (e.g., dead axle, guide wheels with vertical central axis, rollers/casters, etc.), and/or any other suitable wheels. As an example, a drive mechanism can include a first set of driving wheels (e.g., axles parallel to base plane in a deployed configuration; coupled to a traction drive system and/or drive line) and a second set of (non-driving) guide rollers (e.g., defining a maximum width/footprint in a deployed configuration; aligning against guide rail/track). Additionally, wheels can include unitary wheels (e.g., body rotates around central axis/hub) and/or multi-roller wheel assemblies (e.g., rollers symmetrically or asymmetrically arranged about central axis of the wheel; poly-wheels, Mecanum wheels, omni-wheel assembly, helical roller assembly, etc.). In variants, wheels and/or rollers can be metal (e.g., aluminum/steel alloys), plastic, rubberized, self-lubricating (e.g., PTFE, Delrin, oil-impregnated, etc.), coated, uncoated, and/or otherwise configured. Drive mechanisms can include or be used in conjunction with internal actuators (e.g., integrated actuators, such as hub motors), external actuators, onboard actuators (e.g., power transmission/drivetrain coupling the drive mechanism to an onboard actuator), offboard actuators (e.g., gondola/cable actuation, belt drive, driven by externally controlled electromagnetic field, etc.), electric motors (e.g., AC motor, DC motor, BLDC motor, inrunner, outrunner, synchronous, asynchronous, brushed, brushless, permanent magnet, and/or any other suitable type of motors), servos, stepper motors, linear motors, and/or any other suitable types of actuators. Drive mechanisms and/or tray actuation mechanisms can include or be used with any suitable drivetrain and/or power transmission mechanisms, which can include: integrated actuators (e.g., hub motors), direct drives (e.g., shaft couplers, such as with integrated spring and/or damping elements, flexible couplings, universal joints, angular joints, etc.), bevel drives (e.g., an example is shown in FIG. 11), belt transmissions (e.g., timing belts, V-belts, flat belts, serpentine belts, poly-V belts, etc.), chain drives (e.g., roller chains, etc.), gearboxes (e.g., spur, helical, planetary, harmonic, cycloidal, worm, etc.), screw mechanisms (e.g., ball screw drive, lead screw drive, helical drive, etc.), CVTs, differentials, gear trains (e.g., spur gear train, 90 degree bevel drive, etc.) and/or any other suitable power transmission mechanisms.

In a first variant, the vertical drive mechanism can include spur geartrain to transmit power between an inboard actuator (i.e., proximal to the chassis and/or mechanically coupled to the chassis) and a distal/outboard roller worm. For example, the spur gear(s) can rotate about axes parallel with the drive axis (e.g., vertical axes parallel with the Z-drive axis), or can be otherwise configured. In a second variant, the driveline to helical drive can include a set of bevel gears (e.g., allowing the actuation axis to be parallel to and/or concentric with the direction of deployment, substantially orthogonal to the axis of the vertical drive. In a third variant, the helical drive can include an integrated hub motor within the roller worm. However, the helical drive can include any other suitable driveline and/or transmission.

Figures 9, 10:
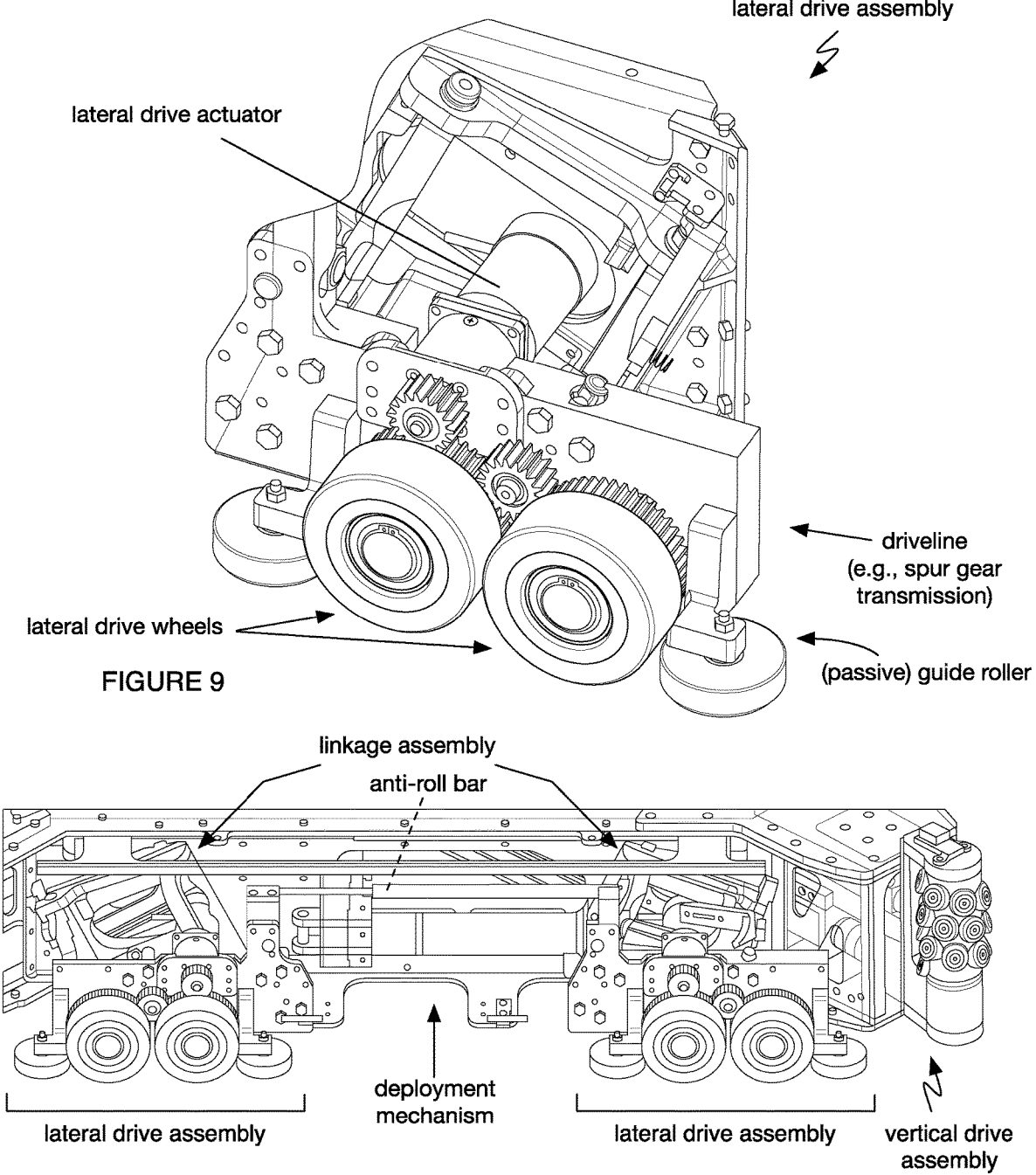
FIG. 9 is a partial isometric view of an example lateral drive mechanism in one or more variants of the system.
FIG. 10 is a partial isometric view of an example system.

The drive mechanisms 140 (and/or deployment mechanisms 150) can include or operate in conjunction with any suitable suspension architecture(s), which can include: independent axle/module suspensions (e.g., swing axle, sliding pillar, MacPherson strut, Chapman strut, double wishbone, multi-link, trailing arm, semi-trailing arm, swinging arm, etc.), semi-independent suspension, dependent suspension (e.g., Statchell, Panhard, Watt's, WOBlink, Mumford, leaf spring, etc.), and/or any other suitable type of suspension. The suspension can be passive, adaptive/semi-active (e.g., active damping, etc.), active suspension, and/or any other suitable type of suspension. The suspension for each drive mechanism can optionally include an anti-roll bar (e.g., spanwise along axis of rotation; between parallel drive modules on one side of the vehicle; roll-bar, pitch-bar, etc.; an example of a lateral drive assembly module is shown in FIG. 9; an example integration with an anti-roll bar is shown in FIG. 10), and/or altogether exclude anti-roll bars. Variants can include damping elements and/or spring elements such as: coil springs, air springs, leaf springs, and/or any other suitable spring elements. Additionally, in some variants the suspension can include the deployment mechanisms and/or linkage thereof (e.g., hydro-pneumatic actuation, linkage actuation, etc.). Drive mechanisms and/or suspensions thereof can be modular (e.g., independent drive modules, dependent/coupled sub-modules) and/or split (e.g., independent on opposing sides of a drive axle). However, the drive mechanism can alternatively operate without suspension/damping elements in one or more axes, and/or can be otherwise configured.

Drive mechanisms 140 can be suspended independently and/or collectively along each drive axis, within each quadrant of the chassis, on either side of a midfrontal plane, on either side of a midsagittal plane, on each side of the vehicle (e.g., left, right, front, rear), and/or can be otherwise suitably suspended. However, the suspension can be otherwise configured.

The drive mechanisms 140 can include: lateral drive mechanisms 142 and vertical drive mechanisms 144. In a first variant, the drive mechanisms can include a set of lateral drive mechanisms. Each lateral drive mechanism facilitates translation along a respective lateral axis of the robot. For example, lateral drive mechanisms, such as electric rail trolleys, can drive traversal along a first and second orthogonal axes (e.g., X-drive and Y-drive). In a second variant, nonexclusive with the first variant, the drive mechanisms can include a set of vertical drive mechanisms (e.g., Z-drive). For example, the Z-drive mechanisms can include the mechanism described in U.S. application Ser. No. 18/531,184, filed 6 Dec. 2023, titled "DISCRETE ROLLER ASSEMBLY-BASED HELICAL DRIVE FOR TRANSLATION," which is incorporated herein in its entirety by this reference.

In variants, control of the vertical drive mechanisms can be coordinated by the computing system to maintain stability (i.e., rotational angles) of the system relative to the frame.

In a first example, the vertical drive mechanisms can be controlled in opposite directions, based on the orientation of the helical drive and/or a roller worm thereof, to facilitate translation along a target trajectory. For instance, helical drive mechanisms along each diagonal can be controlled in the same direction, with adjacent drive mechanisms controlled in opposite (counter-rotating) directions. Additionally or alternatively, the vertical drive mechanisms can be controlled at modulating (and/or distinct) rotational frequencies to avoid resonance within the frame structure (e.g., to avoid injecting a single resonant frequency into the frame). Additionally or alternatively, rollers within each vertical drive mechanism can be arranged with distinct angles (e.g., zenith angles, pitch variance, etc.) and/or angular spacing about the vertical axis, which may similarly improve the modal characteristics of the vertical drive. However, the drive mechanism(s) can be otherwise suitably controlled.

The system can include three drive mechanisms (e.g., orthogonal), four drive mechanisms (e.g., parallel sub-modules), six drive mechanisms, eight drive mechanisms, twelve drive mechanisms (e.g., four drive modules on each of three parallel axes; three orthogonal drive modules at each quadrant/corner of the robot), more than twelve drive mechanisms, and/or any other suitable number of drive mechanisms. In variants, groups of drive mechanisms/submodules can be mechanically coupled and/or collectively powered by any suitable power transmission mechanisms (e.g., timing belt, V-belt, etc.) in any suitable combinations/permutations. Additionally or alternatively, each drive mechanism can be powered/controlled by a respective actuator.

Sub-modules of lateral drive mechanisms can be mechanically coupled by a deployment mechanism(s) and/ or a linkage assembly thereof. Additionally or alternatively, sub-modules of (parallel) lateral drive mechanisms can be coupled by anti-roll bars, which may facilitate gap traversal (e.g., across nodes in the frame architecture) and/or roll/ pitch stability of the system.

However, the system can include any other suitable drive mechanisms and/or the drive mechanisms can be otherwise configured.

In a first variant (e.g., an example of which is shown in FIG. 5), the system can include a first and a second pair of vertical drive mechanisms, each vertical drive mechanism comprising a roller worm defining a respective central axis which is parallel with the vertical axis, wherein the respective central axes of the first and second pairs of vertical drive mechanisms are within the first and second diagonal planes, respectively. The vertical drive mechanisms can be independently actuated (e.g., by a corresponding linear actuator), actuated pairs (e.g., along the diagonal), and/or otherwise suitably actuated. Additionally, in the first variant the system can include a first traction drive comprising at least four wheels, each rotatable about a respective wheel axis which intersects the midsagittal plane; and a second traction drive comprising at least four wheels, each rotatable about a respective wheel axis which intersects the midfrontal plane.

In second variant (e.g., examples of which is shown in FIG. 6, FIGS. 7A-7D, and FIG. 8) nonexclusive with the first, the system can include three drive systems defining (three) orthogonal drive axes, each drive system comprising: a first motor arranged to the left of the midsagittal plane and forward of the midfrontal plane; a second motor arranged to the left of the midsagittal plane and rearward of the midfrontal plane; a third motor arranged to the right of the midsagittal plane and forward of the midfrontal plane; and a fourth motor arranged to the right of the midsagittal plane and forward of the midfrontal plane, wherein each of the first, second, third, and fourth actuators is configured to drive rotation of a respective body about a respective axis parallel with the respective drive axis of the drive system; and a set of deployment mechanisms coupling the drive systems to the chassis and configured to independently articulate each drive system between: a first configuration wherein an intersection of the reference plane and each of the respective bodies driven by the first, second, third, and fourth motors is a subset of the reference area; and a second configuration wherein each of the respective bodies of the first, second, third, and fourth motors does not intersect the reference area.

However, the robot can be otherwise configured.

3.4 Deployment Mechanism(s)

The deployment mechanisms 150 function to change drive mechanism configurations and/or transition a drive mechanism(s) between a deployed/retracted configuration. The deployment mechanisms also function to adjust spacing between drive mechanisms (e.g., in the same axis) and/or robot footprint. Each deployment mechanism is preferably mounted to the chassis and structurally supports a drive mechanism at a distal/deployment end (e.g., coupling the drive mechanism to the frame, such as proximal to a diagonal of the frame), but can additionally or alternatively be suspended and/or coupled to the frame. Each deployment mechanism is preferably communicatively coupled to the computing system (and/or an actuator controller/driver thereof) and powered by the chassis power source (e.g., battery), but can be otherwise configured.

Deployment mechanism(s) can include a linkage, actuator, and/or any other suitable subcomponents. The deployment mechanisms are preferably coupled to the frame and a drive mechanism(s), but can be otherwise configured. Additionally or alternatively, each deployment mechanism can define a respective degree of freedom of the drive mechanism (i.e., articulating the drive mechanism along a respective path). Deployment mechanisms can transform drive mechanisms along any suitable path(s) and/or trajectory (ies), which can be linear (e.g., or substantially linear, such as with a flexible coupler in line), rotational, and/or a combination thereof (e.g., 2D spiral, 3D spiral, arcuate linkage trajectory, etc.). However, deployment mechanism (s) can facilitate any other suitable configuration changes and/or pose transformations of a drive mechanism(s).

In a first variant, the deployment mechanisms can include a set of lateral deployment mechanisms (e.g., X-deploy and Y-deploy). For example, a first lateral deployment mechanism (e.g., coupled to a pair of drive mechanisms with parallel wheel assemblies; left X-deploy) and a second lateral deployment mechanism (e.g., opposite the first across a midsagittal plane; right X-deploy) can transform a first and a second lateral drive mechanism, respectively, between a first and second configuration, respectively, to change the width (and/or lateral footprint of first and second drive mechanisms) between the first and second configurations (e.g., an example is shown in FIG. 4A, a second example is shown in FIG. 4B).

In a second variant, the deployment mechanisms can include a set of vertical deployment mechanisms (e.g., Z-deploy). For example, each vertical drive mechanism can be actuated by a respective deployment mechanism (e.g., away from a central/vertical axis of the robot and/or each of the other deployment mechanisms) to change the distance between the vertical drive and each of the other vertical drive mechanisms (e.g., an example is shown in FIGS.

3A-3B). As a second example, a vertical drive mechanism(s) can change a vertical footprint (and/or robot width) between a first and second configuration.

In a third variant, the deployment mechanisms can include a support tray deployment mechanism. For example, a tray engagement can be driven by multiple (e.g., four) independent actuators or a unitary actuator coupled to multiple outputs via a timing belt.

Each deployment mechanism 150 can include an actuator which functions to provide an actuation input to the linkages and/or drive mechanism to transform the drive mechanism between configurations (e.g., deployed/retracted). The actuator can mounted at a terminal end of a robotic assembly system (e.g., end of a kinematic chain/wrist, etc.), integrated into the linkage (e.g., acting as one element or kinematic constraint of the linkage, etc.), coupled to a drive-line/transmission, and/or can be otherwise but can be otherwise implemented. The actuator can be powered: electrically (e.g., servo or motor actuation), pneumatically, hydraulically, and/or otherwise suitably powered. The actuation input provided by the actuator can be linear, rotational, or a combination thereof. The actuator can be single acting, multi-stage (e.g., double acting), bi-directional (e.g., powered in both directions along an actuation axis), and/or otherwise configured. The actuator can have a single actuation end (e.g., with an opposing end fixedly mounted) or two actuation ends (e.g., actuating in opposite directions and centrally mounted between the actuation ends). Actuators can optionally include or operate in conjunction with: auto-locking, passive braking (e.g., in power loss scenario), passive returns (e.g., spring return, etc.), passive deployment (e.g., passive support tray deployment, etc.), and/or can be otherwise configured. Deployment mechanism actuators can be the same type(s) as the drive mechanism actuators and/or can rely on a different actuation type, different power source(s), distinct degree(s) of freedom, and/or can be otherwise configured. In variants, deployment mechanism actuator(s) can be communicatively coupled to the computing system and/or a controller thereof (e.g., electrical communication; fluid communication; etc.), and/or can be otherwise suitably controlled/articulated. However, the deployment mechanism(s) can include any other suitable actuator(s).

Deployment mechanism(s) 150 can include a linkage, which functions to transform the actuation input from the actuator into a relative transformation of a drive mechanism(s). Additionally or alternatively, a linkage can function to transition a respective drive mechanism between a first configuration (e.g., retracted configuration) and a second configuration (e.g., deployed configuration; extended configuration; etc.), such along a trajectory (e.g., single degree of freedom, defined by the constraints of the linkage, etc.).

The linkages preferably include revolute (a.k.a. hinged) joints, but can additionally or alternatively include prismatic (a.k.a. sliding) joints, spherical joints, cylindrical joints, universal joints, planar joints, and/or any other suitable joints. The mechanical linkages can be coupled and/or formed into a unitary kinematic chain, multiple kinematic chains, open kinematic chains, closed kinematic chains, and/or arranged in any other suitable configuration(s). The set of mechanical linkages can include one or more: lever mechanism (e.g., hinged linkage), scissor linkage, 3-bar linkage, 4-bar linkage (e.g., parallelogram linkage), 5-bar linkage, 6-bar linkage, planar linkage, spatial linkage, Scott Russell linkage, crank-rocker linkage, slider-crank, drag-link mechanism, and/or any other suitable linkage(s). Set(s) of linkages are preferably substantially symmetric (e.g., in a projected plane, mirror symmetry, 90 degree rotational symmetry, etc.), but can alternatively be asymmetric. However, any suitable types and/or arrangements of linkages can be used, and/or the deployment mechanisms can be otherwise constrained.

In variants, linkages can be integrated into vehicle suspension and/or can include suspension elements, such as flexible couplings, anti-roll bars, springs (e.g., coil springs, torsional springs, etc.), damping elements, and/or any other suitable suspension elements. Additionally, deployment mechanism actuators can be integrated into the linkage assembly and/or can at least partially constrain the linkage assembly. However, the linkages can be otherwise configured.

In a first variant, the lateral drives can be coupled to the frame by an actuatable four-bar linkage with an integrated suspension (e.g., anti-roll bar), with a linear actuator configured to change the effective length of a bar of the linkage to articulate the lateral drive (e.g., an example is shown in FIG. 10).

However, deployment mechanisms may be otherwise configured.

Figure 17A:
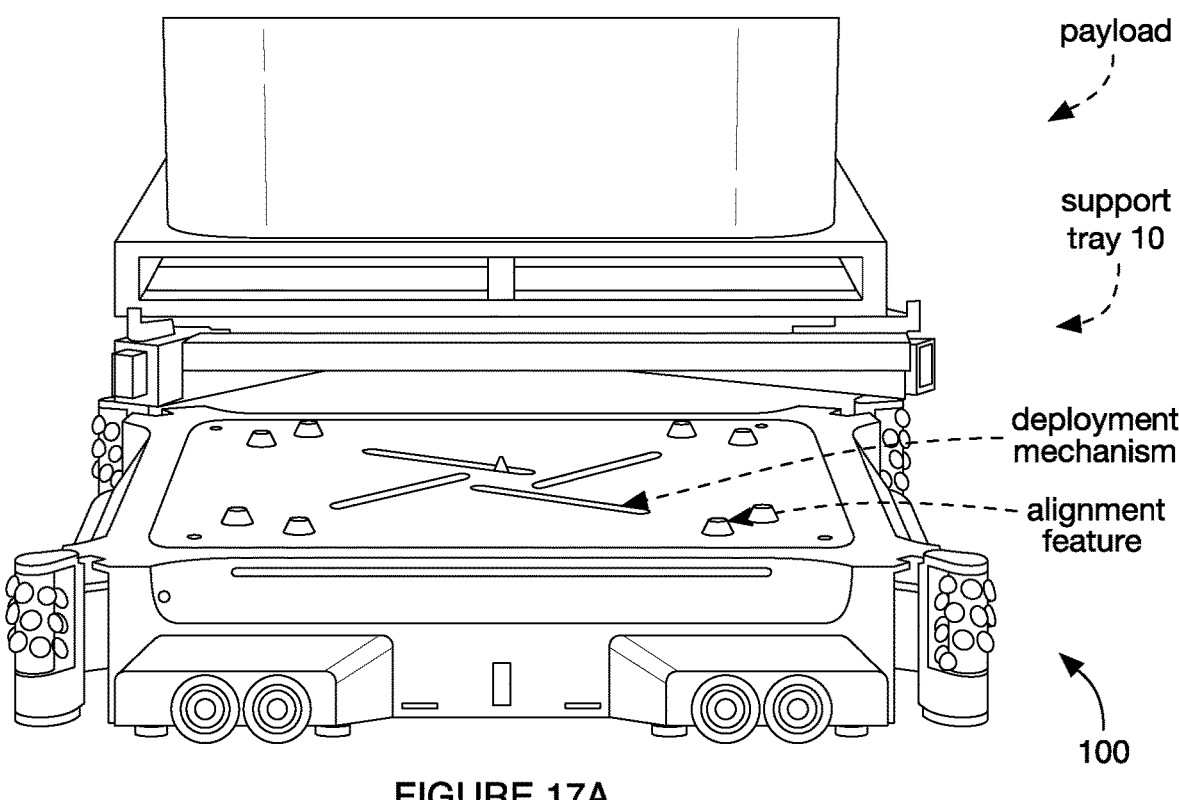
FIGS. 17A-17B illustrate a first variant of the system with a payload disengaged and a second variant of the system with the engaged, respectively.
Figure 17B:
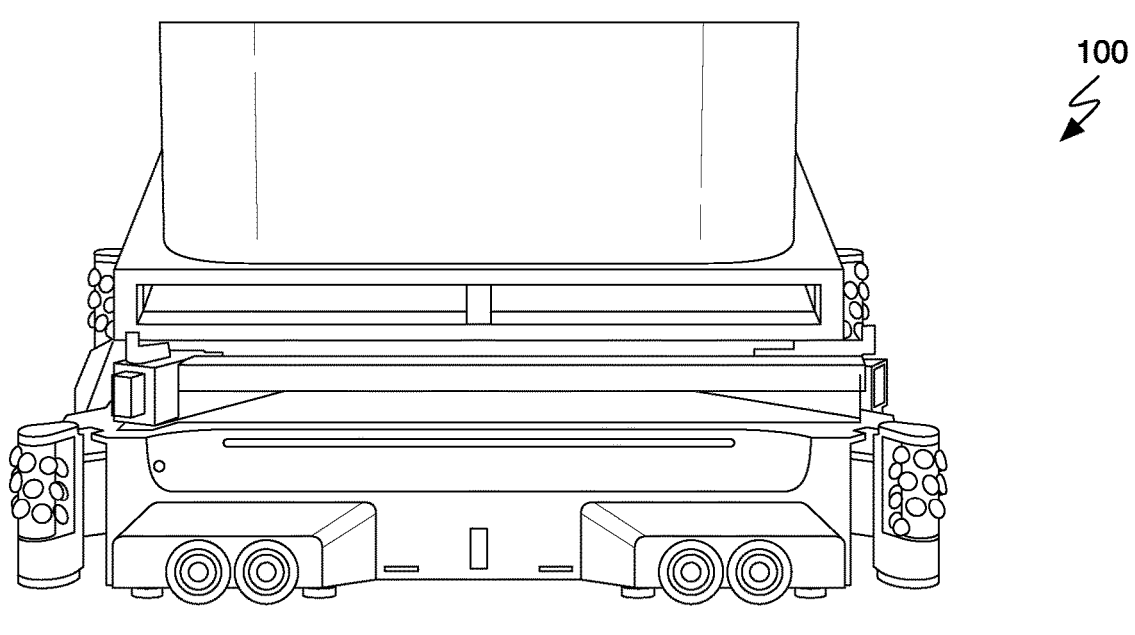
Figure 18A:
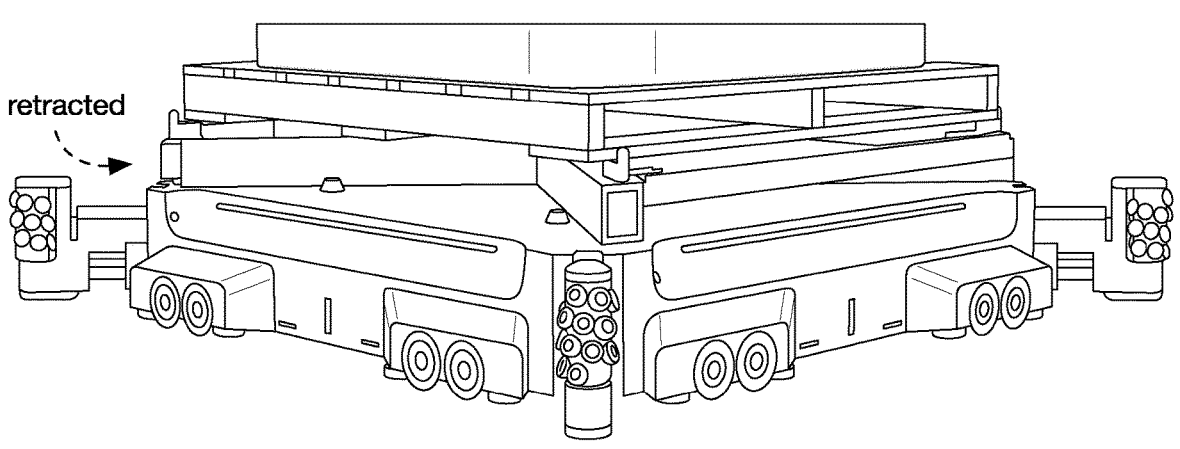
FIGS. 18A-18C are three-dimensional views of a variant of the system in a first configuration, second configuration, and third configuration, respectively.
Figure 18B:
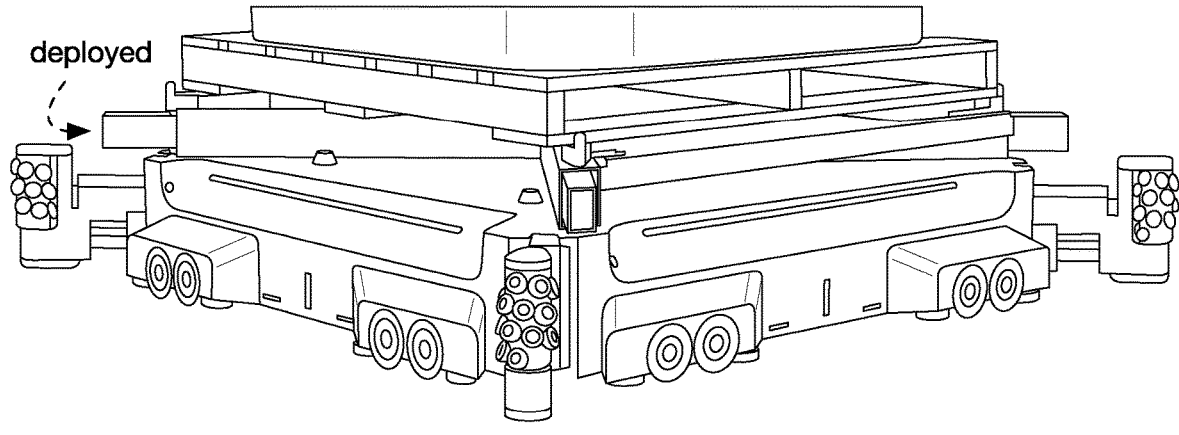
Figure 18C:
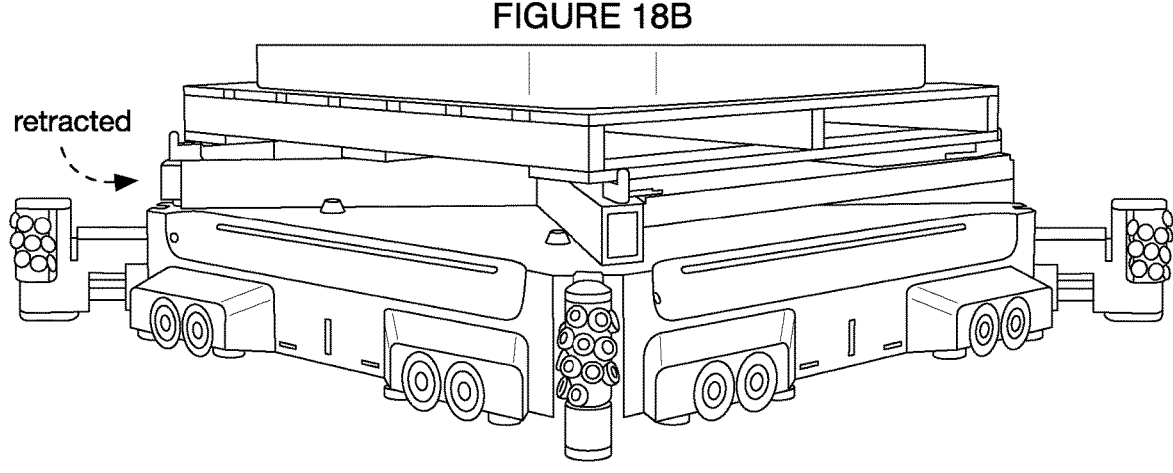

The system can optionally include a set of tray actuators 160, which function to articulate the support trays to engage and/or disengage the frame. Tray actuators can be integrated with the set of deployment mechanisms or separate. The tray actuators can articulate the entire body of the support tray and/or a portion thereof (e.g., passive arms of the cell tray, etc.). The tray actuators can articulate the support trays along the structural interface (e.g., at a load bearing component, such as facilitating self-centering/alignment) or at a separate, secondary interface (e.g., by actuating a set of dowel pins, etc.; an example is shown in FIG. 17A).

The tray actuators can include: a lift mechanism (e.g., jackshaft with support bushings, lead screw lift, four bar lift, cable driven lift, etc.), a radial deployment mechanism (e.g., cable driven), individual/modular actuators (e.g., within each quadrant; along diagonals; proximal to each engagement feature, etc.), collective actuators (e.g., jointly actuating multiple ends with a single actuator, etc.), and/or can be otherwise configured. As an example, a support tray can be supported by the superior surfaces of the self-locating assembly features of the set of vertical lift mechanisms, wherein the self-locating assembly features of the vertical lift mechanisms cooperatively constrain a yaw orientation of the cell tray about the vertical axis.

Alternatively, the same linkage(s) used to deploy a lateral drive mechanism(s) can be used to articulate the trays to facilitate engagement and/or disengagement, or the support trays can be separately articulated/controlled.

However, the deployment mechanisms can be otherwise configured.

3.5 Computing System

In variants, the system 100 can include or be used in conjunction with a computing system 130, which can include a central computer and/or a plurality of actuator controllers. The computing system and/or various computing operations thereof can be centralized, distributed (e.g., modularized), local/onboard, remote and/or otherwise implemented. The computing system preferably controls actuation based on sensor feedback (e.g., CAN/LIN network communications) and/or facilitate I/O communication (e.g., with a remote server, remote/centralized planner, cloud computing resources, external data storage, HMI control system, etc.). The computing system and/or the controller(s)

thereof can include: one or more: CPUs, GPUs, custom FPGA/ASICS, microprocessors, servers, cloud computing, and/or any other suitable components. The controllers and/or elements of the computing system can be communicatively coupled in series, parallel, and/or any combination thereof (e.g., parallel/star configuration). However, the computing system can be otherwise configured.

The computing system 130 can receive sensory inputs/measurements from the sensor suite, which can be used to determine a vehicle state and dynamically control the system 100 based on the vehicle state. For example, the computing system can control deployment mechanisms to effect system configuration change(s) and/or control the drive system(s) based on the vehicle state.

Figure 21:
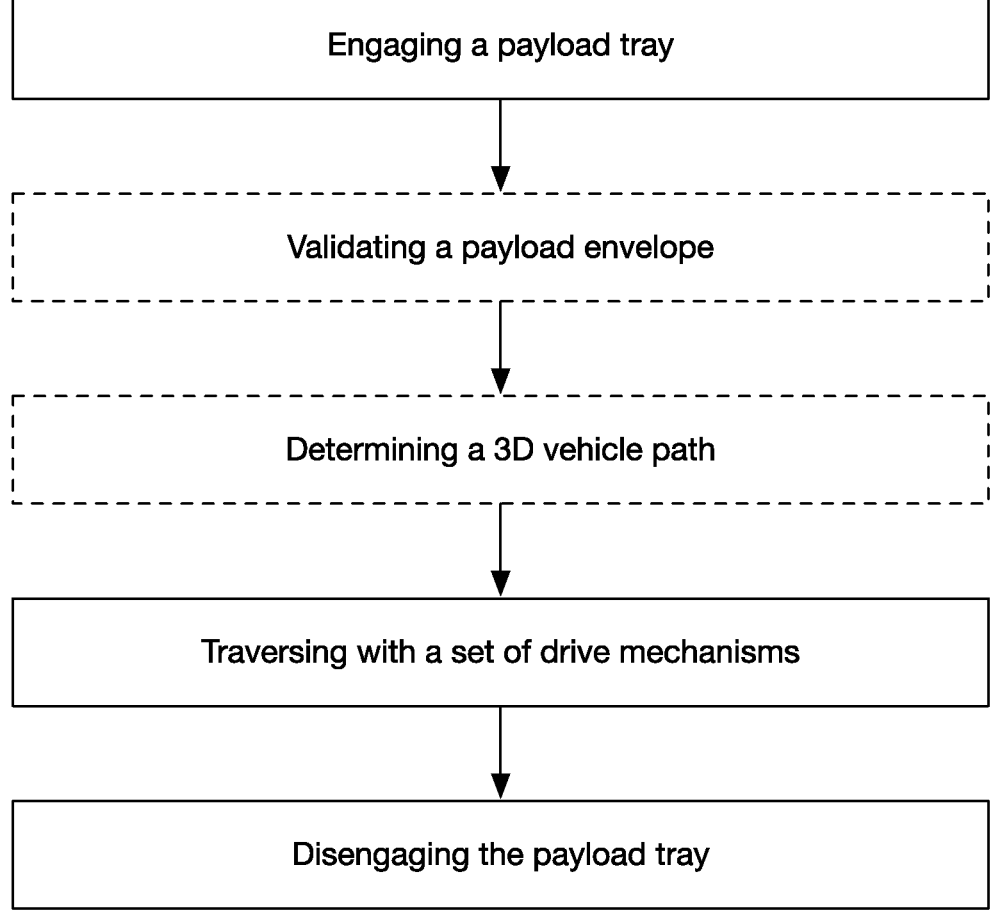
FIG. 21 is flowchart diagrammatic representation of a variant of the method.

In variants, the computing system 130 is preferably an autonomous computing system which facilitates navigation along a (3D) path/trajectory received (wirelessly) from a remote computing system (e.g., a remote planner, teleoperator, etc.). Additionally or alternatively, the computing system can function to implement external navigation commands, teleoperation commands (e.g., received from a remote teleoperator), autonomous collision avoidance/control, and/or any other system controls. The computing system can include a battery management system (BMS), actuator controllers (e.g., motor inverter, hydraulic/pneumatic controllers, etc.), and/or any other suitable components. The computing system is preferably onboard the chassis (e.g., mounted to the chassis, etc.), but can additionally or alternatively include one or more remote computing elements and/or distributed/cloud processing elements. The computing system can be centralized (e.g., packaged within a single module), distributed (e.g., across multiple compute nodes, packaged within multiple compute modules, etc.), and/or can be otherwise configured. In variants, the computing system 130 can facilitate control in accordance with the method(s) as described in U.S. application Ser. No. 19/046,366, filed 5 Feb. 2025, U.S. application Ser. No. 19/236,841, filed 12 Jun. 2025, and/or U.S. application Ser. No. 19/056,180, filed 18 Feb. 2025, each of which is incorporated herein in its entirety by this reference. In a first example, the computing system can control the robot as shown in FIG. 20. In a second example, the computing system can control the robot 100 as shown in FIG. 21.

However, the system can include or be used with any other suitable computing system(s).

3.6 Support Tray

Figure 12:
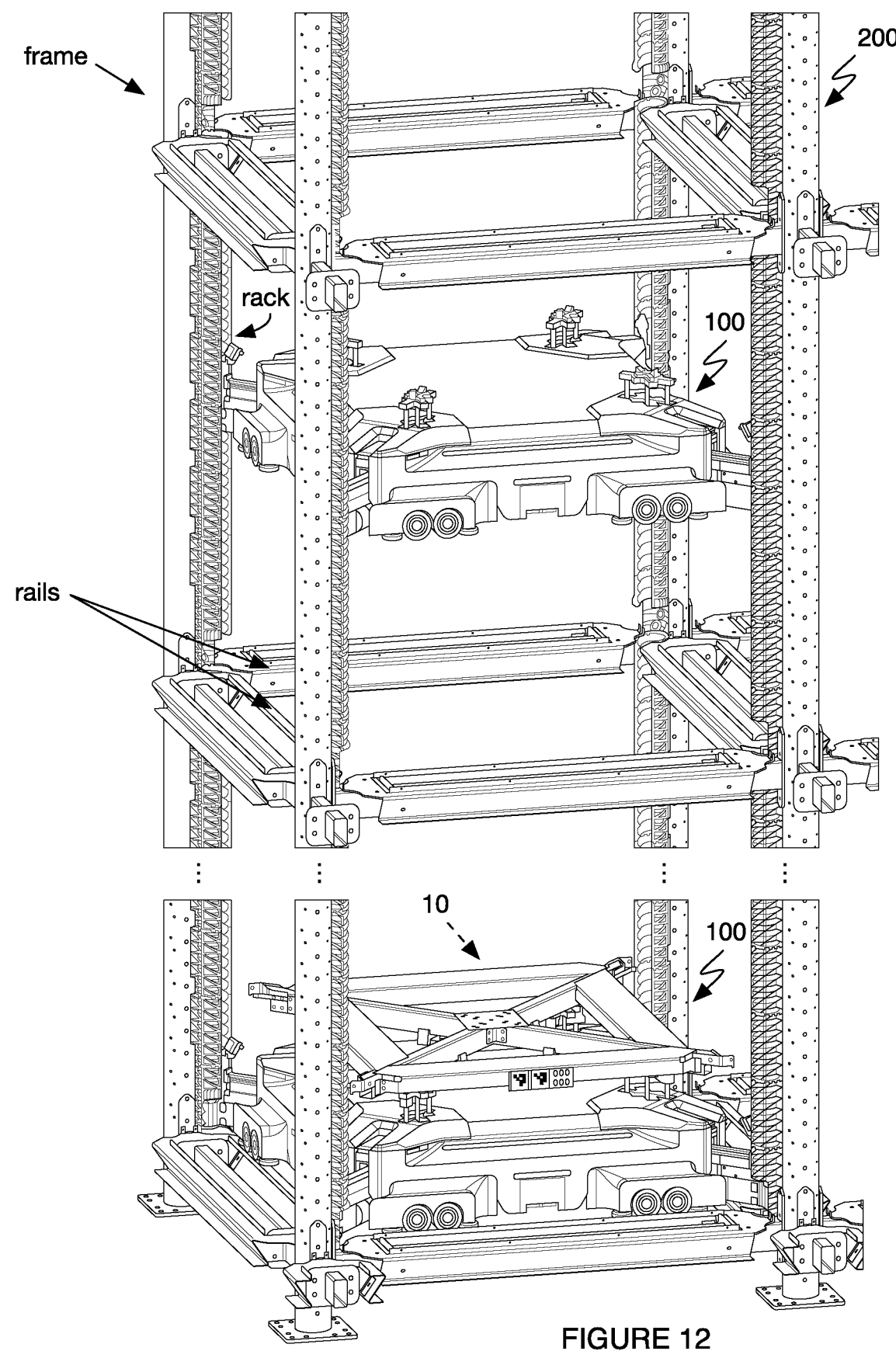
FIG. 12 is a 3D view of a variant of the system within a support frame.
Figure 13:
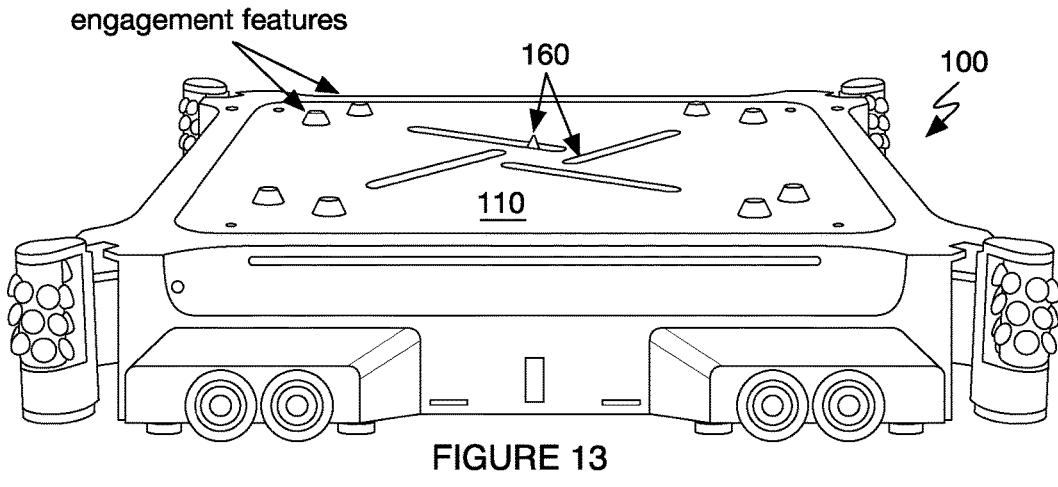
FIG. 13 is a 3D view of a variant of the system.

The system can optionally include or be used with a support tray 10, which functions to support a payload (e.g., cargo container) within the frame support structure (e.g., examples are shown in FIGS. 12, 14B, 17A-17B, and 18A-18C). The support tray is preferably passively actuated (e.g., no onboard controller system(s) and/or actuators; engaged and/or actuated by a deployment mechanism of the robot), but can additionally or alternatively be actively controllable (e.g., onboard deployment mechanisms), separately actuated (e.g., externally), substantially rigid (e.g., an example is shown in FIG. 12), and/or can be otherwise configured. As an example, one or more engagement features at a superior surface of the system can mechanically couple the system to a support tray and/or facilitate deployment of the support tray (e.g., via an onboard deployment mechanism).

The support tray can be configured to engage with/at a set of superior surfaces of the robot at a set of self-locating assembly feature(s) (e.g., defining an engagement interface).

For example, conical pins, inclined surfaces/chamfers (e.g., orthogonal pairs of chamfers), and/or any other suitable self-locating features can center the support tray relative to the chassis and constrain yaw rotation about the vertical axis.

As an example, a support tray can be supported by the superior surfaces of the self-locating assembly features of the set of vertical lift mechanisms, wherein the self-locating assembly features of the vertical lift mechanisms cooperatively constrain a yaw orientation of the cell tray about the vertical axis.

Lift points and/or engagement surfaces of the support tray are preferably along the diagonals of the robot and distal to the centroid (e.g., as close to the upper vertices as possible; reducing the distance between the mounting of drive mechanisms and the supports while increasing stability), but can be otherwise configured.

However, the system can include any other suitable components.

4. Helical Drive

Variants of the vertical drives (a.k.a. Z-drive) can include or operate in conjunction with a discrete roller assembly-based helical drive system used for translation along a vertical axis (e.g., also referenced herein as a "roller worm"). A roller worm can include a body portion, and a plurality of discrete roller assemblies disposed in a first helical pattern about the body portion, where the roller worm is configured to rotate about a central axis to cause linear translation of the roller worm along a length of an engagement structure and the primary axis.

In some aspects, the roller worm may also include where the body portion includes a cylindrical structure including a first circular base, a second circular base, and a central body portion connecting the first circular base to the second circular base. The roller worm may also include where the central axis is parallel to and collinear with the primary axis. The roller worm may also include where the central axis is not parallel to the primary axis. The roller worm may also include where the roller assemblies have at least one of a cylindrical structure, a conical structure, or an ellipsoid structure. The roller worm may also include where the roller assemblies are disposed in the first helical pattern for at least one turn about the body portion. The roller worm may also include where the roller assemblies extend from a surface of the body portion along a respective roller assembly axis at an angle greater than 0 degrees and less than 180 degrees relative to the central axis. The roller worm may also include where a ratio of a pitch of the first helical pattern to a diameter of the body portion is in a range of 0.3 to 3.2. The roller worm may also include where a ratio of a diameter of each of the roller assemblies to a diameter of the body portion is in a range of 0.2 to 0.6. The roller worm may also include where at least one of the roller assemblies includes a roller element on an exterior of the roller assembly, where the roller element is configured to rotate about a roller assembly axis. The roller worm may also include where the engagement structure includes a plurality of tracks disposed along the length of the engagement structure. The roller worm may also include where a drive component is configured to cause rotation of the roller worm. The roller worm may also include where at least one supporting element is configured to cause the roller worm to linearly translate along the primary axis based on rotation of the roller worm about the central axis.

In some aspects, the roller worm may also include where the central axis extends through a center of each of the first circular base and the second circular base. The roller worm may also include where a surface of the central body portion is parallel to the central axis. The roller worm may also include where the at least one of the roller assemblies further includes (i) at least one inner race coupled to the body portion and (ii) at least one outer race rotationally coupled to the at least one inner race and configured to rotate about the roller assembly axis, where the roller element is coupled to the at least one outer race or the at least one outer race includes the roller element. The roller worm may also include where each of the tracks is configured to receive at least one of the roller assemblies. The roller worm may also include where each of the tracks includes a complementary geometry relative to the roller assemblies. The roller worm may also include where each of the tracks includes at least one contact surface configured to contact at least one of the roller assemblies. The roller worm may also include where the roller assemblies are configured to (i) rotate about the central axis and (ii) contact the contact surfaces to cause translation of the roller worm along the length of the engagement structure. The roller worm may also include where the tracks are disposed in a second helical pattern along the length of the engagement structure, where a first pitch of the first helical pattern is equivalent to a second pitch of the second helical pattern. The roller worm may also include where the tracks are evenly spaced along the length of the engagement structure.

In one set of variants, the helical drive system can include a roller worm including a body portion, and a plurality of discrete roller assemblies disposed in a first helical pattern about the body portion. The helical drive system can also operate with an engagement structure (e.g., helical rack) including a primary axis, where the roller worm is configured to rotate about a central axis to cause linear translation of the roller worm along a length of the engagement structure and the primary axis.

In some aspects, the helical drive system may also be configured wherein the body portion includes a cylindrical structure including a first circular base, a second circular base, and a central body portion connecting the first circular base to the second circular base. The helical drive system may also include where the central axis is parallel to and collinear with the primary axis. The helical drive system may also include where the central axis is not parallel to the primary axis. The helical drive system may also include where the roller assemblies have at least one of a cylindrical structure, a conical structure, or an ellipsoid structure. The helical drive system may also include wherein the roller assemblies are disposed in the first helical pattern for at least one turn about the body portion. The helical drive system may also include where the roller assemblies extend from a surface of the body portion along a respective roller assembly axis at an angle greater than 0 degrees and less than 180 degrees relative to the central axis. The helical drive system may also include where a ratio of a pitch of the first helical pattern to a diameter of the body portion is in a range of 0.3 to 3.2. The helical drive system may also include where a ratio of a diameter of each of the roller assemblies to a diameter of the body portion is in a range of 0.2 to 0.6. The helical drive system may also include where at least one of the roller assemblies includes a roller element on an exterior of the roller assembly, where the roller element is configured to rotate about a roller assembly axis. The helical drive system may also include where the engagement structure includes a plurality of tracks disposed along the length of the engagement structure. The helical drive system may also include where a drive component is configured to cause rotation of the roller worm. The helical drive system may also include where at least one supporting element is configured to cause the roller worm to linearly translate along the primary axis based on rotation of the roller worm about the central axis.

In some aspects, the helical drive system may also include where the central axis extends through a center of each of the first circular base and the second circular base. The helical drive system may also include where a surface of the central body portion is parallel to the central axis. The helical drive system may also include where the at least one of the roller assemblies further includes (i) at least one inner race coupled to the body portion and (ii) at least one outer race rotationally coupled to the at least one inner race and configured to rotate about the roller assembly axis, where the roller element is coupled to the at least one outer race or the at least one outer race includes the roller element. The helical drive system may also include where each of the tracks is configured to receive at least one of the roller assemblies. The helical drive system may also include where each of the tracks includes a complementary geometry relative to the roller assemblies. The helical drive system may also include where each of the tracks includes at least one contact surface configured to contact at least one of the roller assemblies. The helical drive system may also include where the roller assemblies are configured to (i) rotate about the central axis and (ii) contact the contact surfaces to cause translation of the roller worm along the length of the engagement structure. The helical drive system may also include where the tracks are disposed in a second helical pattern along the length of the engagement structure, where a first pitch of the first helical pattern is equivalent to a second pitch of the second helical pattern. The helical drive system may also include where the tracks are evenly spaced along the length of the engagement structure.

The roller worm may include a number of roller assemblies. For example, the roller worm may include N number of roller assemblies, where N is any positive integer. In some cases, the roller assemblies may have a cylindrical shape (e.g., substantially cylindrical shape). In other cases, the roller assemblies may be conical-shaped roller assemblies or ellipsoid-shaped roller assemblies. Each of the roller assemblies may be connected to the central body portion of the roller worm. The roller assemblies may extend from a surface of the central body portion in one or more helical turns around the central body portion, such that the roller assemblies form a helical (also referred to as "spiral") pattern about the central body portion. The roller assemblies 130 may extend from a surface of the central body portion at an angle ranging from greater than 0° to less than 180° relative to the central axis. As an example, a roller worm may include a body portion 112$a$ having roller assemblies each extending along a respective central axis orthogonally (90°) from a central body portion of the body portion relative to the central axis, where the roller assemblies each include a roller element, an inner race, and an outer race rotationally coupled to the inner race and fixedly combined with the roller element. In some cases, the roller assemblies may only extend toward the first circular base portion or a second circular base portion at an angle relative to the central axis 115. As an example, a roller worm may include a body portion having roller assemblies each extending along a respective central axis at angle that is not orthogonal (e.g., 700) from a central body portion of the body portion relative to the central axis 115, where the roller assemblies (i) are angled toward the first circular base portion, (ii) each include first and second inner races, (iii) each include first and second outer races, (iv) each include one or more roller bearing elements disposed between the inner races 142b and the outer races, where an outer race is rotationally coupled to a respective inner race via one or more of the roller bearing elements, and (v) each include a roller element coupled to the exteriors of the first and second outer races. The roller worm including roller assemblies each extending at an angle that is not orthogonal relative to the central axis may enable (i) use of larger diameter roller assemblies relative to roller assemblies used in a roller worm 110a and (ii) self-centering of the roller worm during translation along the axis.

In some variants, the roller assemblies may be disposed around the central body portion in one or more helical turns having a selected (e.g., constant or variable) helical pitch. As an example, the roller assemblies may be disposed around the central body portion 116 with a constant helical pitch of approximately 30 mm. A helical pitch of the one or more helical turns of the roller assemblies may refer to a length between two adjacent positions on adjacent (e.g., consecutive) turns of the one or more helical turns along a central axis of the roller worm. For example, a helical pitch may be equivalent to a length between a center of a first turn of the roller assemblies and a center of a second turn of the roller assemblies, where the first turn and the second turn are adjacently positioned on the surface of the central body portion and where an angular separation between the center of the first turn and the center of the second turn is 0° relative to a central axis of the roller worm. In some cases, the roller assemblies may have a selected helical pitch without the roller worm including more than one helical turn of roller assemblies. Based on rotation of the roller worm about the central axis, the roller assemblies may rotate about a helical path and a helical pitch of the roller assemblies may be equivalent to a distance between adjacent points on consecutive helical turns of the roller assemblies along the helical path. In some cases, the roller assemblies may be evenly spaced or variably spaced along the helical path on the body portion of the roller worm 110. As an example, the roller assemblies may be evenly spaced along the central body portion 116, such that each roller assembly is a selected distance from another adjacent roller assembly 130. As another example, the roller assemblies may be variably spaced along the central body portion, such that distances between adjacent roller assemblies are not equivalent.

In some embodiments, a diameter of each of the roller assemblies 130, a number of the roller assemblies 130 included in the roller worm 110, and/or a helical pitch of the roller assemblies 130 may be selected based on a diameter of the body portion 112 of the roller worm 110. As an example, for the roller worm 110, a ratio of a helical pitch of the roller assemblies 130 and a diameter of the body portion 112 may range from approximately 0.3 to 3.2 and may preferably be 0.6 (e.g., based on a ratio of a 30 mm helical pitch of the roller assemblies 130 and a 50 mm diameter of the body portion 112). As another example, a ratio of a diameter of each of the roller assemblies 130 and a diameter of the body portion 112 may range from approximately 0.2 to 0.6 and may preferably be 0.45 (e.g., based on a ratio of a 32 mm diameter of the roller assemblies 130 and a 70 mm diameter of the body portion 112).

The helical drive system can optionally be used with an engagement structure. In some cases, the engagement structure may be a linear rack or a linear frame along which the roller worm may linearly translate via rotation about the central axis of the roller worm. When the roller worm rotates about the central axis, contact (e.g., engagement) between the roller assemblies and the engagement structure may apply a linear thrust force to the roller worm, thereby causing the roller worm to linearly translate along an axis (also referred to as a "primary axis") of the engagement structure. Based on a direction of rotation (e.g., clockwise or counterclockwise) of the roller worm and an orientation of the helical pattern of the roller assemblies, the roller worm may translate (e.g., linearly translate) in a first direction or second directions (e.g., forward or backward, left or right, or upward or downward) along a length of the engagement structure, wherein the first direction is opposite the second direction. In some cases, the central axis about which the roller worm rotates may be parallel to and collinear with the axis. Alternatively, the central axis about which the roller worm rotates may not be parallel to the axis, such that the central axis may be oriented at an angle relative to the axis (e.g. ranging from greater than 0° to less than 900).

However, the helical drive(s) may be otherwise configured.

5. Cell Frame Structure

The system can include, interface with, and/or operate within a frame and/or an engagement structure(s) thereof, which functions to support the robot, and define and enable its movement in multiple directions. For example, the robot is preferably able to move in 3 dimensions (e.g., x-, y-, and z-directions) throughout the frame structure. Additionally or alternatively, the frame structure can enable other movement, limit (e.g., selectively limit) certain movements, and/or otherwise facilitate storage and/or transit of materials. For example, where the robot can move horizontally between cells through the deployment and retraction of the lateral drive(s). Additionally, the frame structure further preferably defines (helical) racks along columns of the frame, wherein the racks enable vertical translation of the robot(s) and can additionally function to: prevent slippage of the robot relative to the helical rack; promote smooth translation of the robot; and/or perform any other functions. In some variants, the helical racks define varying circumferential angles (equivalently referred to herein as circumferential span) along their lengths. For example, the helical racks can have a smallest circumferential span at the end where the robot enters the helical rack (which enables the arms of the robot to enter and engage with the helical rack), where the circumferential span increases (e.g., gradually, in a stepped fashion, etc.) along its length, which functions to contain the robot once it is engaged.

The frame can be made up of and/or define a plurality of adjacent cells, which can optionally interlock to form the larger storage grid. In variants, the cells can be modular units that can be arranged interchangeably to create a storage grid of any suitable size, such as a storage grid that spans multiple levels vertically and/or horizontally. In examples, the storage grid can be: a multi-level storage grid (e.g., a multi-level storage rack, 2 cells high, 3 cells high, 4 cells high, 5 cells high, 10 cells high, 20 cells high, greater than 20 cells high, any open or closed range bounded by the aforementioned values, etc.) with any number of cells arranged along a lateral plane, a single level storage grid with any number of cells arranged along a lateral plane, configured to be a cuboid shape (e.g., a plurality of rectangular configurations of cell sets stacked on top of another), configured to be an irregular shape, and/or any other suitable configuration (e.g., based on the storage needs of a facility in which the storage grid is used).

The frame structure is preferably configured as a moment frame to facilitate robot routing within the system. For example, a moment frame grid can both support a downward load of the weight of the materials, and efficiently resist bending moments produced as material handling robots travel along the beams of the storage grid. Further, the open shape of a moment frame, defined by beams and columns, enables a material handling robot to travel between adjacent cells (e.g., by traveling on beam structural rails or up the columns of the cells) without maneuvering around additional support structures. For example, the robot can traverse along a path encircling a column and/or within a clearance annulus encircling a column of the frame.

However, in additional or alternative variants, the storage grid can include (e.g., at all cells, at a subset of cells, etc.) braced frames and/or other suitable structural configurations that provide sufficient stability and access for the robot(s).

However, the system can be otherwise configured.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An Automated Storage and Retrieval System (AS/RS) robot comprising:
a chassis comprising a top plane, a first diagonal plane, and a second diagonal plane, wherein the intersection of the first diagonal plane and the second diagonal plane defines a vertical axis which is orthogonal to the top plane and comprises a centroid of the chassis;
a first and a second pair of vertical drive mechanisms, each vertical drive mechanism comprising a roller worm defining a respective central axis which is substantially parallel with the vertical axis, wherein the respective central axes of the first and second pairs of vertical drive mechanisms are within the first and second diagonal planes, respectively;

a first actuator mounted to the chassis and coupled to at least one of the first pair of vertical drive mechanisms, wherein the first actuator is configured to change a first distance between the respective central axes of the roller worms of the first pair of vertical drive mechanisms; and
a second actuator mounted to the chassis and coupled to at least one of the second pair of vertical drive mechanisms, wherein the second actuator is configured to change a second distance between the respective central axes of the roller worms of the second pair of vertical drive mechanisms.

2. The AS/RS robot of claim 1, wherein the chassis further comprises a midsagittal plane and a midfrontal plane, the vertical axis at an intersection of the midsagittal plane and the midfrontal plane, the AS/RS robot further comprising:
a first traction drive comprising at least four wheels, each rotatable about a respective wheel axis which intersects the midsagittal plane; and
a second traction drive comprising at least four wheels, each rotatable about a respective wheel axis which intersects the midfrontal plane.

3. The AS/RS robot of claim 2, wherein each of the at least four wheels of the first traction drive are arranged on a left side of the midsagittal plane, wherein each of the at least four wheels of the second traction drive are arranged on a front side of the midfrontal plane.

4. The AS/RS robot of claim 2, wherein a reference plane parallel to the top plane intersects each wheel of the first traction drive and is offset from each tractive wheel of the second traction drive.

5. The AS/RS robot of claim 2, further comprising: an anti-roll bar coupling a first pair of wheels of the first traction drive to a second pair of wheels of the first traction drive.

6. The AS/RS robot of claim 5, further comprising a first traction motor actuator coupled to the first pair of wheels and a second traction motor coupled to the second pair of wheels.

7. The AS/RS robot of claim 2, further comprising an actuatable linkage coupling a first pair of wheels of the first traction drive to a second pair of wheels and to the frame, wherein a stroke of the actuatable linkage changes a distance between the first and second pairs of wheels, wherein the first and second pairs of wheels are coupled to a first traction motor and second traction motor, respectively.

8. The AS/RS robot of claim 1, further comprising a set of vertical lift mechanisms mounted to the chassis, each defining a self-locating assembly feature at a superior surface.

9. The AS/RS robot of claim 8, wherein the first and second diagonal planes intersect each of the vertical lift mechanisms.

10. The AS/RS robot of claim 8, further comprising a payload tray supported by the superior surfaces of the self-locating assembly features of the set of vertical lift mechanisms, wherein the self-locating assembly features of the vertical lift mechanisms cooperatively constrain a yaw orientation of the payload tray about the vertical axis.

11. The AS/RS robot of claim 1, wherein each vertical drive mechanism comprises a motor mounted to the chassis and coupled to the roller worm by a respective driveline.

12. The AS/RS robot of claim 11, wherein the driveline comprises a set of spur gears, each comprising a rotational axis parallel with the central axis of the roller worm.

13. The AS/RS robot of claim 11, wherein the driveline comprises a bevel gear which is substantially coaxial with the roller worm.

14. The AS/RS robot of claim 1, wherein the AS/RS robot is configured to operate within a rectilinear frame which defines a cell volume, wherein the first and second actuators are configured to transition the AS/RS robot between a first configuration, in which a first vertical projection of the roller worms of the vertical drive mechanisms is within a vertical projection of the cell, and a second configuration, in which a second vertical projection of the roller worms of the vertical drive mechanisms is outside of the vertical projection of the cell.

15. The AS/RS robot of claim 1, wherein the AS/RS robot is a multi-axis rail guided vehicle which further comprises a traction drive coupled to a set of rail-guided wheels.

16. An Automated Storage and Retrieval System (AS/RS) robot comprising:

a chassis defining a midfrontal plane and a midsagittal plane intersecting along a central axis, a reference plane orthogonal to the midfrontal plane and the midsagittal plane, wherein a reference area is defined within the reference plane;

three drive systems defining orthogonal drive axes, each drive system comprising:

a first motor arranged to the left of the midsagittal plane and forward of the midfrontal plane;

a second motor arranged to the left of the midsagittal plane and rearward of the midfrontal plane;

a third motor arranged to the right of the midsagittal plane and forward of the midfrontal plane; and a fourth motor arranged to the right of the midsagittal plane and forward of the midfrontal plane, wherein each of the first, second, third, and fourth motors is configured to drive rotation of a respective body about a respective axis parallel with the respective drive axis of the drive system; and a set of deployment mechanisms coupling the drive systems to the chassis and configured to independently articulate each drive system between:

a first configuration wherein an intersection of the reference plane and each of the respective bodies driven by the first, second, third, and fourth motors is a subset of the reference area; and a second configuration wherein each of the respective bodies of the first, second, third, and fourth motors does not intersect the reference area.

17. The AS/RS robot of claim 16, wherein the reference area comprises a vertical projection of an AS/RS cell.

18. An Automated Storage and Retrieval System (AS/RS) robot comprising:

a chassis defining a vertical axis and four quadrants about the vertical axis; and within each quadrant:

a helical drive mechanism comprising a first motor coupled to a roller worm with an axis of rotation parallel with the vertical axis;

a first actuator coupled to the helical drive mechanism and configured to change a first distance between the axis of rotation of the roller worm and the vertical axis;

a lateral drive mechanism comprising a second motor and a wheel assembly coupled to the motor; and a linkage mounted to the chassis and coupling the lateral drive mechanism to the chassis, the linkage comprising a second actuator configured to change a second distance between the second motor and the vertical axis.

19. The AS/RS robot of claim 18, further comprising: within each quadrant, an actuatable lift mechanism mounted to the chassis.

20. The AS/RS robot of claim 18, further comprising: an autonomous controller and a sensor suite comprising a plurality of perception sensors arranged within each quadrant.

* * * * *